(12) United States Patent
Kitazawa et al.

(10) Patent No.: US 11,190,354 B2
(45) Date of Patent: Nov. 30, 2021

(54) RANDOMNESS VERIFICATION SYSTEM AND METHOD OF VERIFYING RANDOMNESS

(71) Applicant: PANASONIC CORPORATION, Osaka (JP)

(72) Inventors: Atsurou Kitazawa, Fukuoka (JP);
Masaaki Kobayashi, Fukuoka (JP);
Kouji Mutou, Fukuoka (JP)

(73) Assignee: PANASONIC CORPORATION, Osaka (JP)

( * ) Notice: Subject to any disclaimer, the term of this patent is extended or adjusted under 35 U.S.C. 154(b) by 171 days.

(21) Appl. No.: 16/617,912

(22) PCT Filed: Mar. 16, 2018

(86) PCT No.: PCT/JP2018/010661
§ 371 (c)(1),
(2) Date: May 11, 2020

(87) PCT Pub. No.: WO2018/220952
PCT Pub. Date: Dec. 6, 2018

(65) Prior Publication Data
US 2021/0126788 A1    Apr. 29, 2021

(30) Foreign Application Priority Data

Jun. 2, 2017    (JP) ............................. JP2017-110213

(51) Int. Cl.
*H04L 9/32*    (2006.01)
*H04L 9/08*    (2006.01)
*H04L 9/06*    (2006.01)

(52) U.S. Cl.
CPC ............ *H04L 9/321* (2013.01); *H04L 9/0838* (2013.01); *H04L 9/0891* (2013.01);
(Continued)

(58) Field of Classification Search
CPC ..... H04L 9/321; H04L 9/0838; H04L 9/0891; H04L 9/0894; H04L 9/0643;
(Continued)

(56) References Cited

U.S. PATENT DOCUMENTS 7,508,945 B1 *    3/2009    Ferre Herrero ....... H04L 9/0656
380/268
7,975,139 B2 *    7/2011    Coulier ............... H04L 63/0435
713/169
(Continued)

FOREIGN PATENT DOCUMENTS

| JP | 2007-267073 | 10/2007 |
| JP | 2009-098973 | 5/2009 |

(Continued)

OTHER PUBLICATIONS

International Search Report (ISR) from International Searching Authority (Japan Patent Office) in International Pat. Appl. No. PCT/JP2018/010661, dated Jun. 19, 2018, in English.

*Primary Examiner* — Mohammed Waliullah
(74) *Attorney, Agent, or Firm* — Greenblum & Bernstein, P.L.C.

(57) ABSTRACT

A terminal exchanges a common key generated using a seed, the randomness of which was recognized in advance, with a verification server. The terminal generates verification data using a plurality of measured values from a noise source. The terminal encrypts the verification data with the common key and transmits the verification data to the verification server. The verification server verifies the randomness of verification data obtained by decrypting the encrypted verification data with the common key. When it is determined that the verification data has randomness, the verification server transmits a verification result indicating that the randomness of the verification data is recognized to the terminal. The terminal acquires a plurality of measured (Continued)

values and generates a new seed in accordance with the verification result from the server and preserves the new seed in a secure area.

10 Claims, 14 Drawing Sheets

(52) U.S. Cl.
CPC .......... *H04L 9/0894* (2013.01); *H04L 9/0643* (2013.01); *H04L 9/0869* (2013.01); *H04L 2209/08* (2013.01)

(58) Field of Classification Search
CPC . H04L 9/0869; H04L 2209/08; H04L 9/0825; H04L 2209/26; G09C 1/00
See application file for complete search history.

(56) References Cited

U.S. PATENT DOCUMENTS

| | | | | |
|---|---|---|---|---|
| 8,621,598 | B2* | 12/2013 | Lai | ........................ H04L 9/3271 |
| | | | | 726/14 |
| 11,057,201 | B2* | 7/2021 | Tomita | .................... G06F 7/588 |
| 2009/0106615 | A1 | 4/2009 | Nakakita | |
| 2009/0208014 | A1 | 8/2009 | Betouin et al. | |
| 2016/0110165 | A1 | 4/2016 | Kokubo et al. | |
| 2016/0179472 | A1 | 6/2016 | Sugahara | |
| 2018/0262388 | A1* | 9/2018 | Johnson | ............... G06Q 10/103 |

FOREIGN PATENT DOCUMENTS

| | | |
|---|---|---|
| JP | 2011-193180 | 9/2011 |
| JP | 2012-141774 | 7/2012 |
| JP | 2016-081247 | 5/2016 |
| JP | 2016-126518 | 7/2016 |

* cited by examiner

[FIG. 1A]
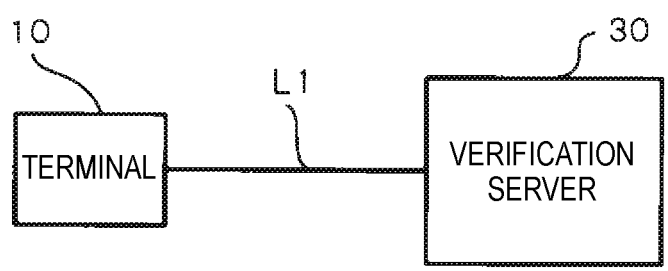
[FIG. 1B]
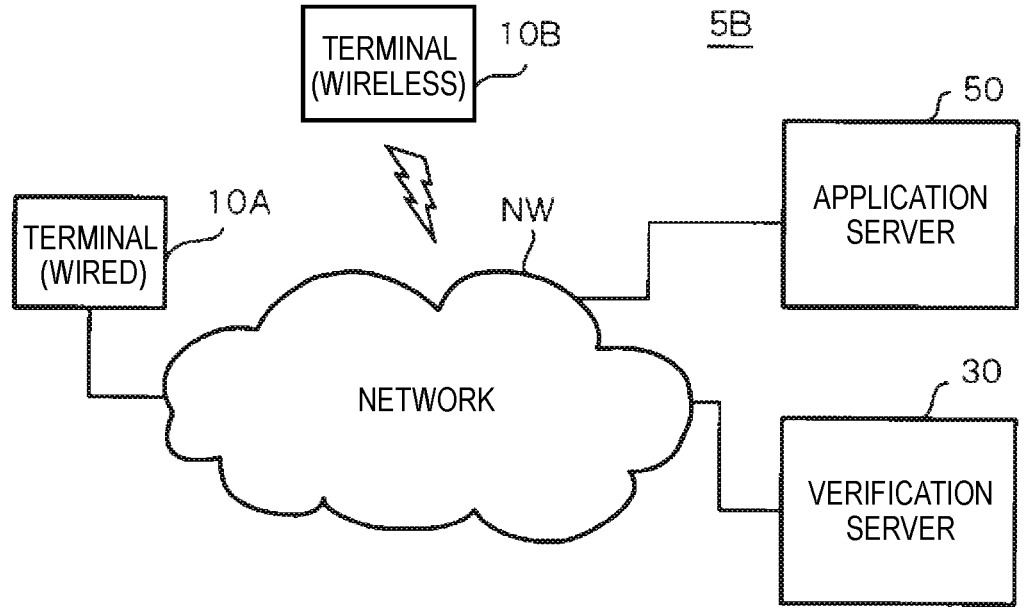

[FIG. 2]
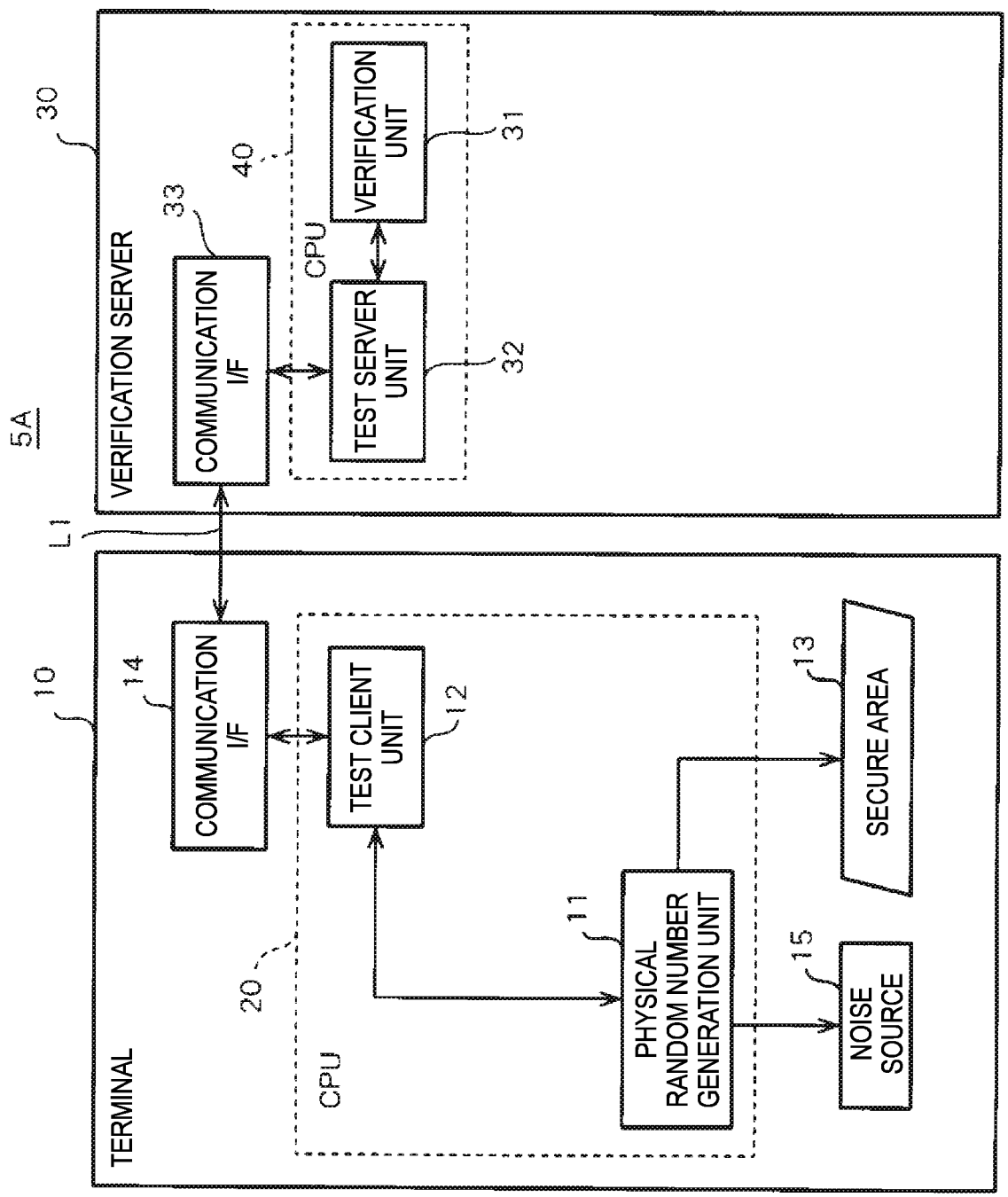

[FIG. 3]
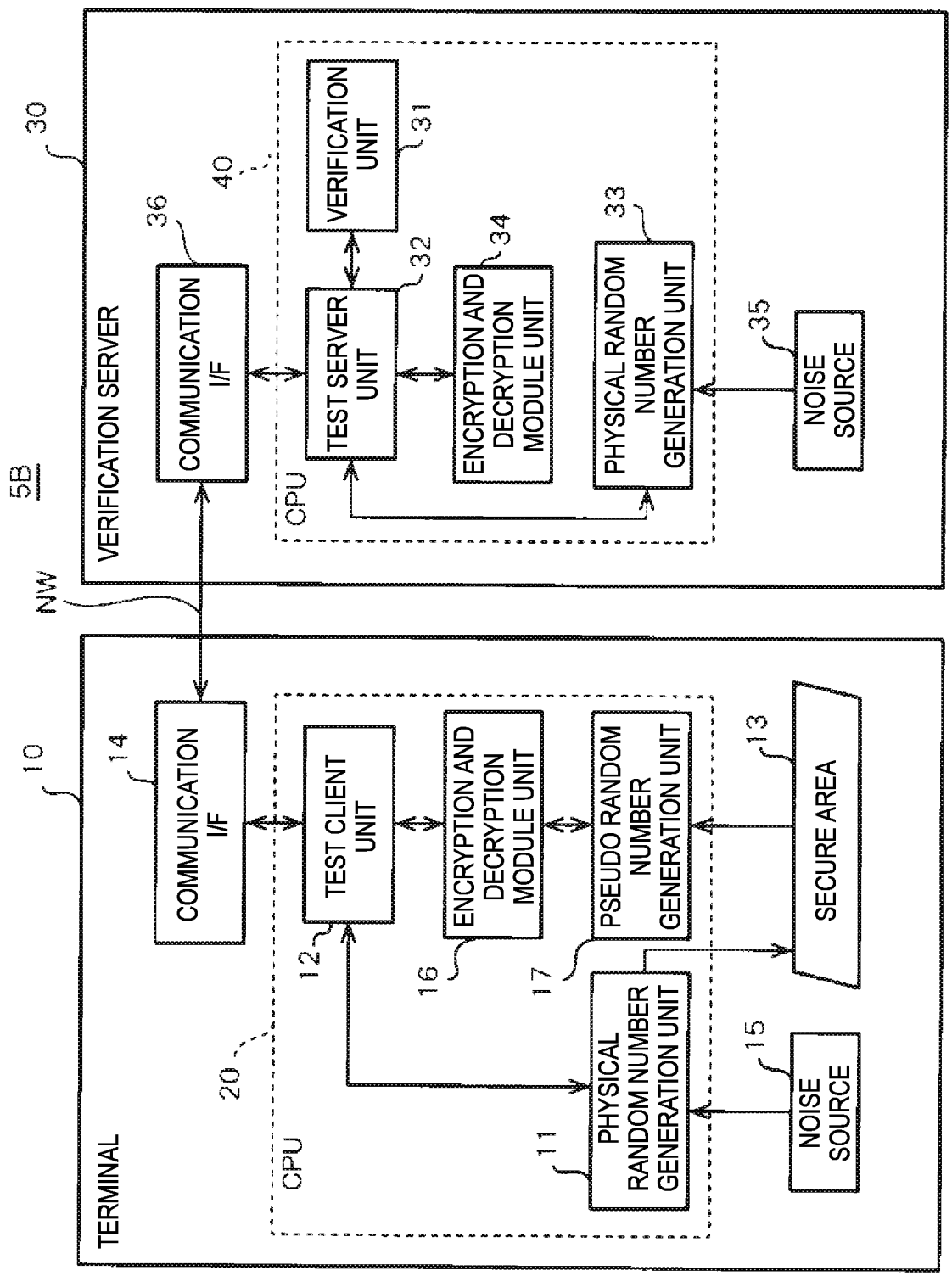

[FIG. 4]
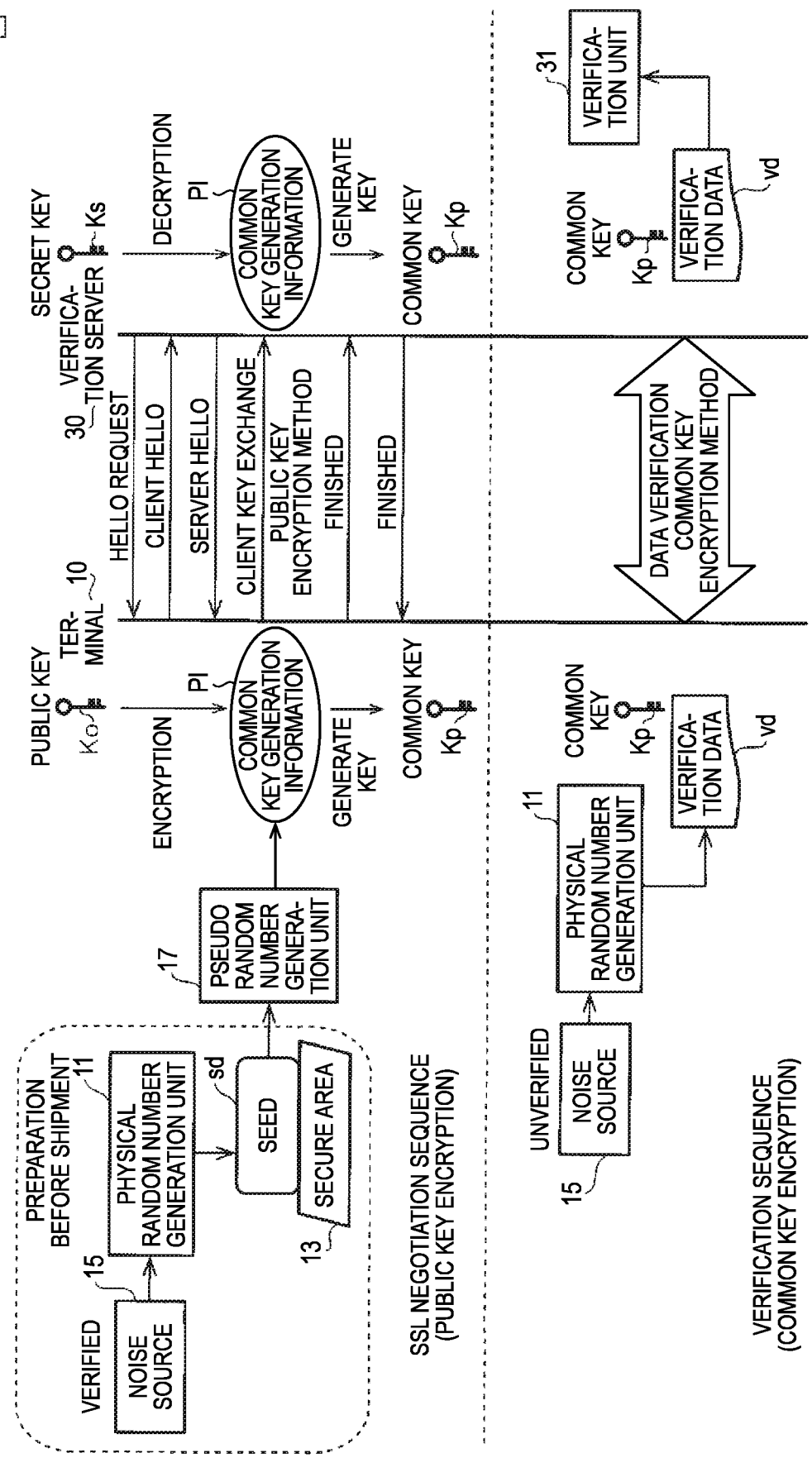

[FIG. 5]
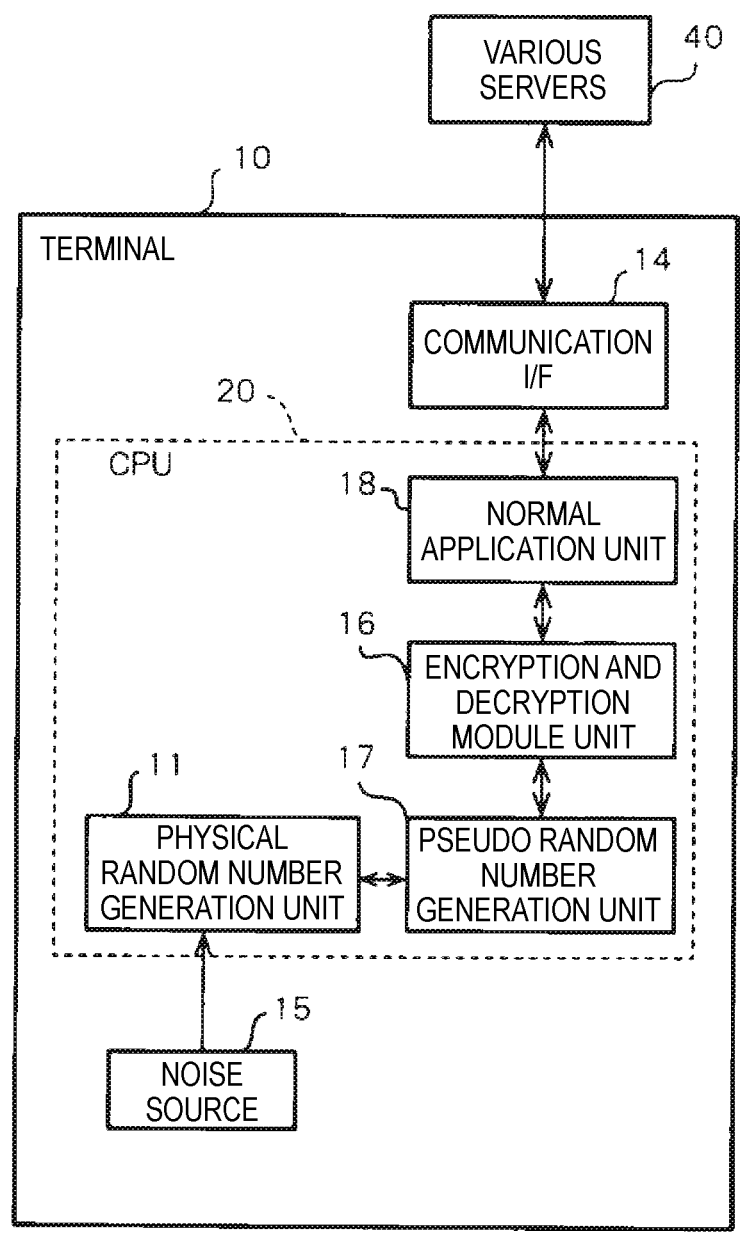

[FIG. 6]
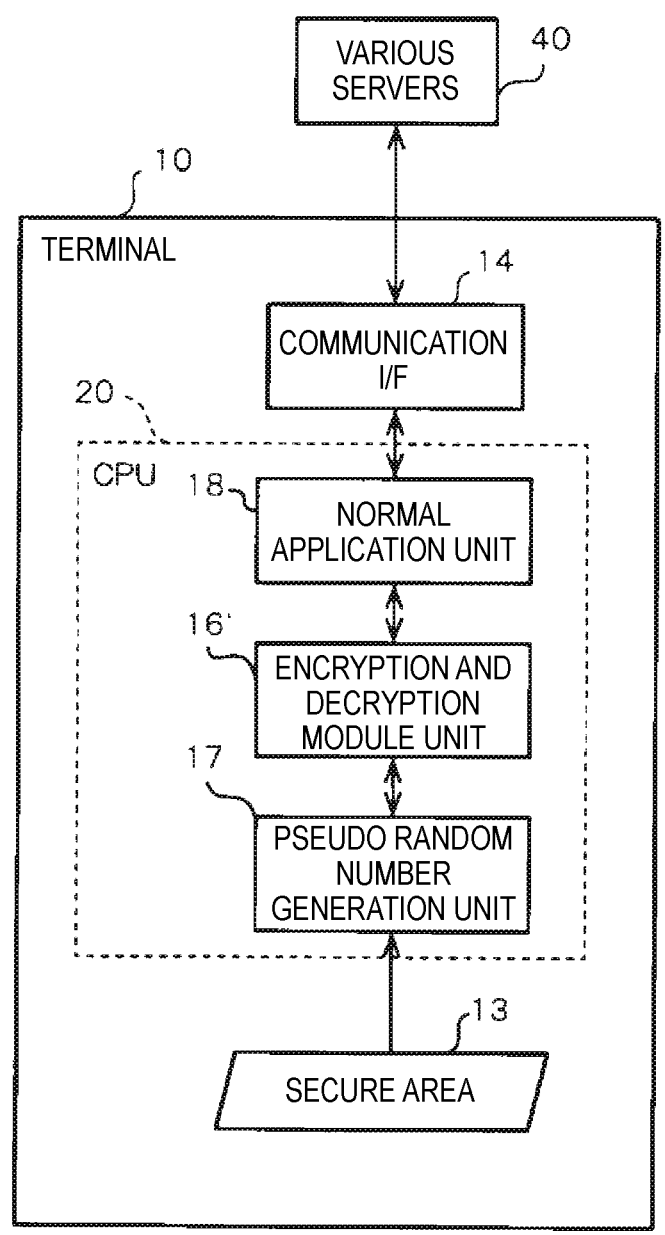

[FIG. 7]
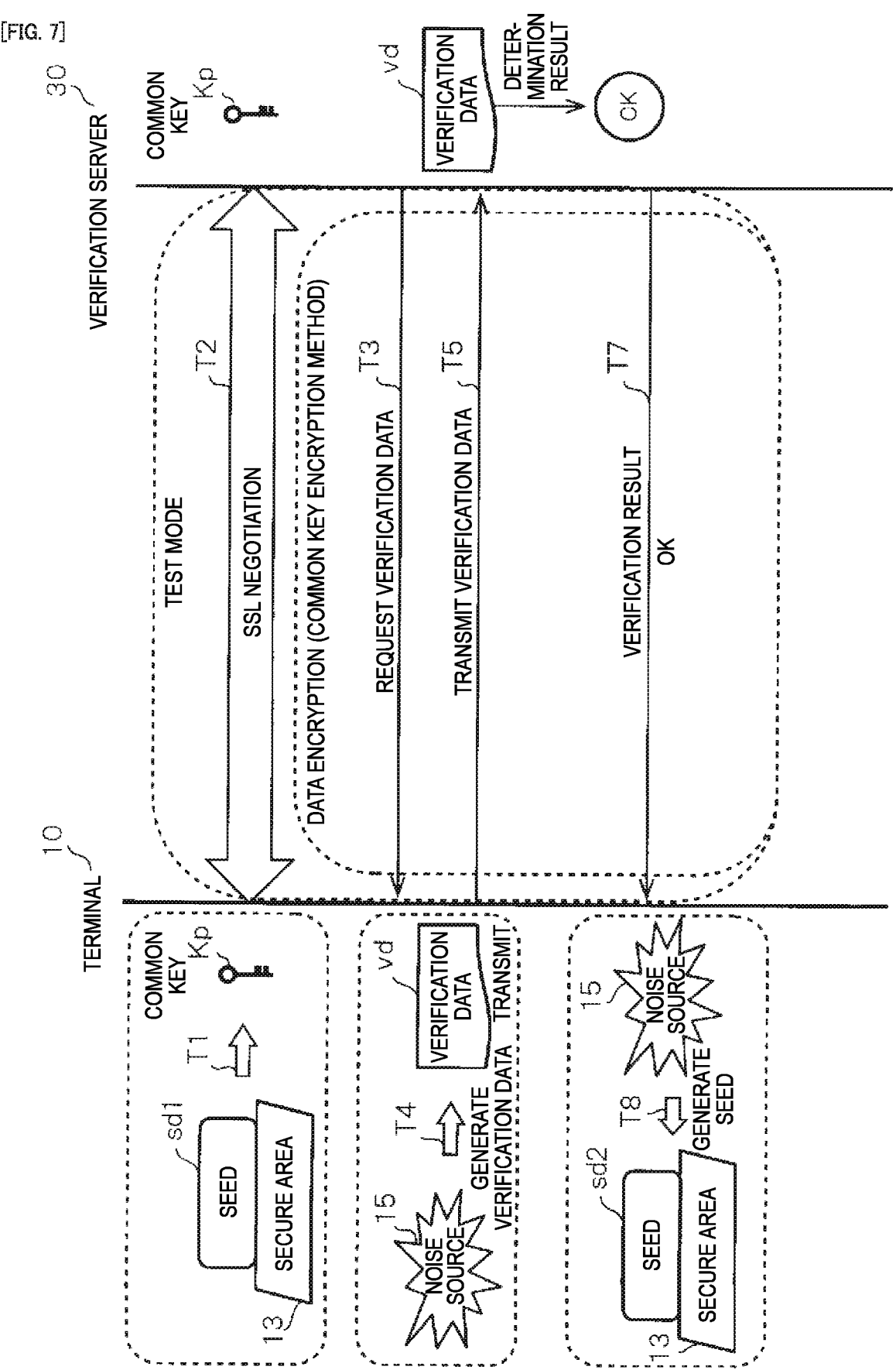

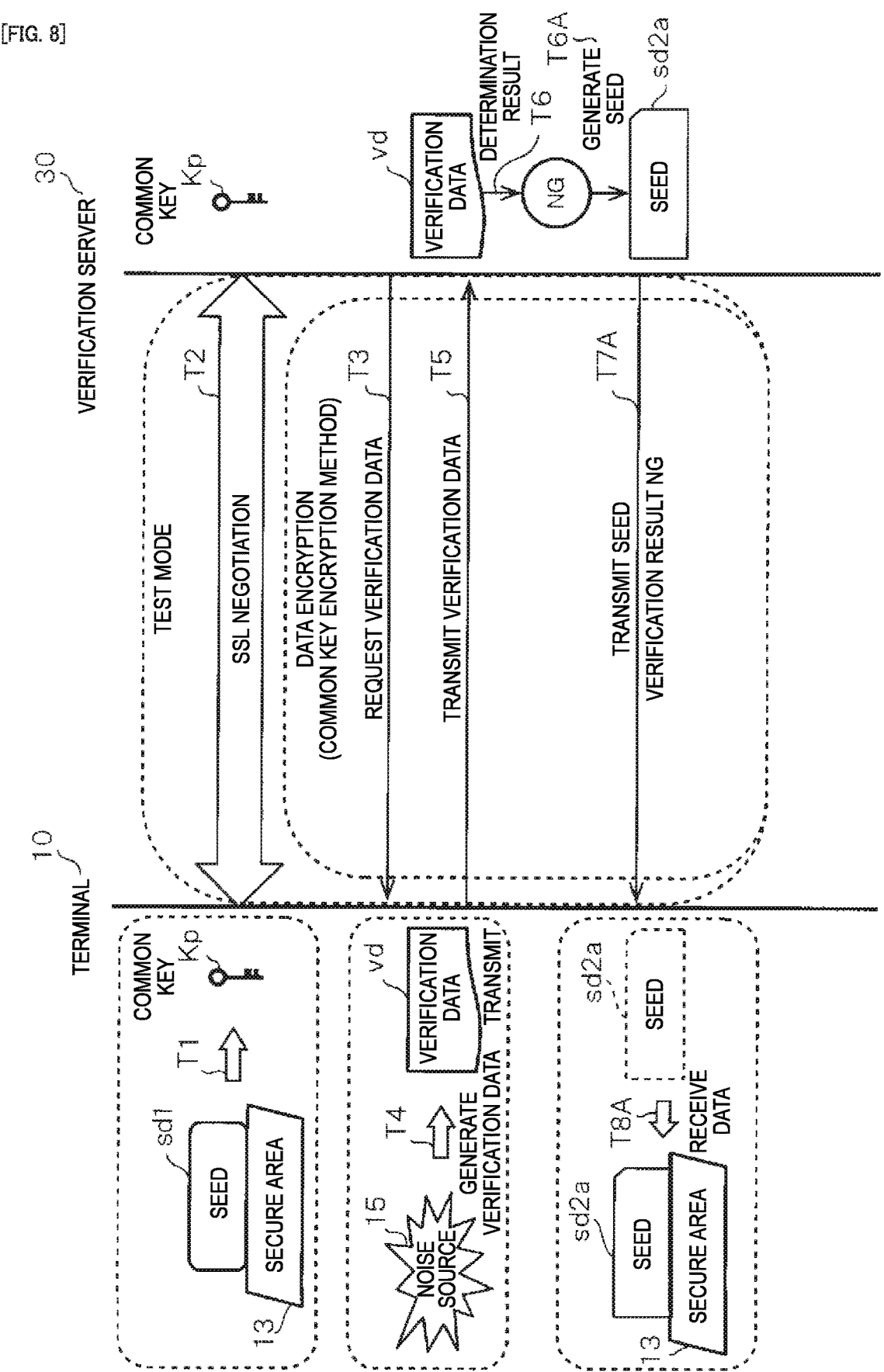
[FIG. 8]

[FIG. 9]
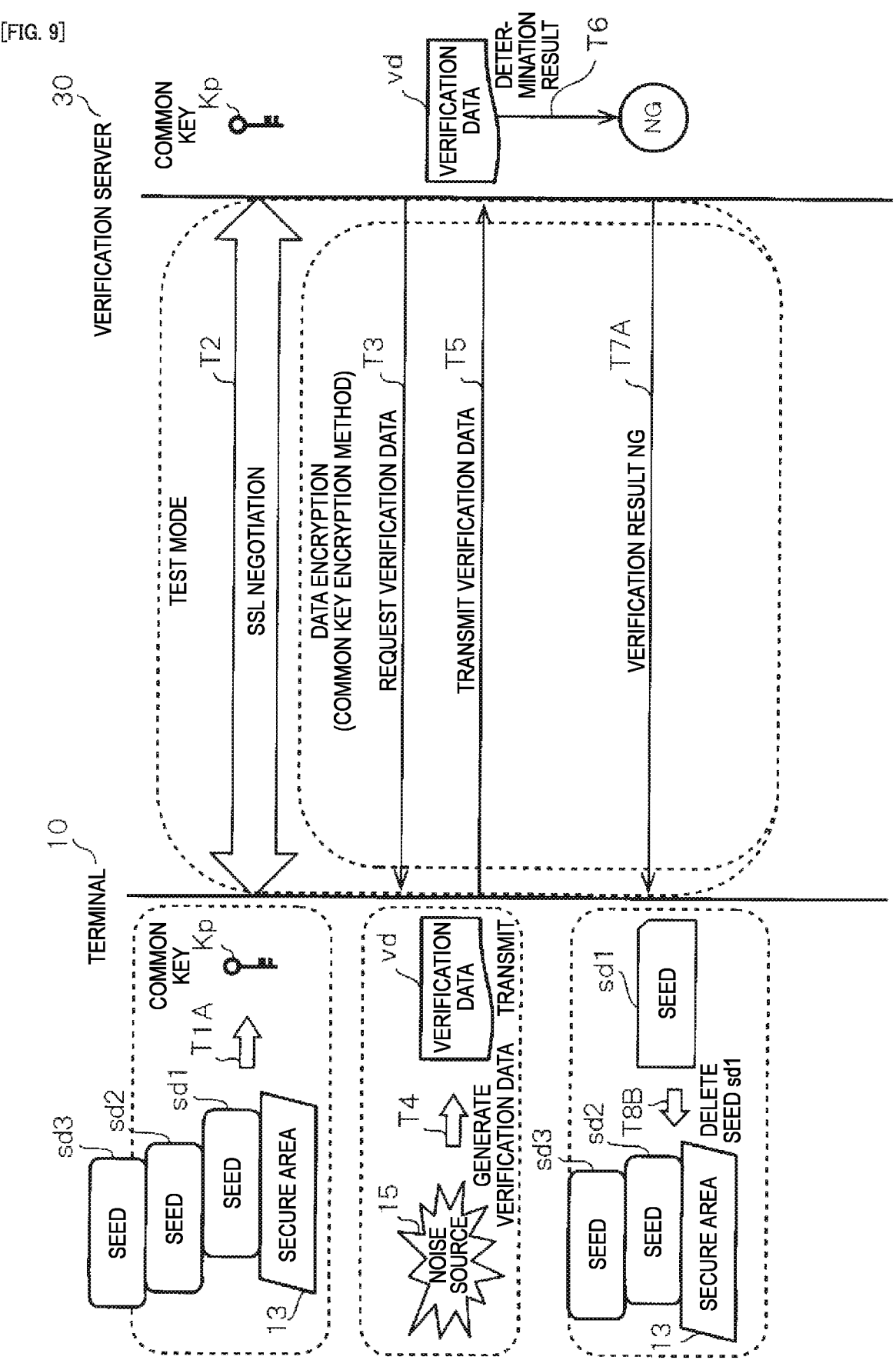

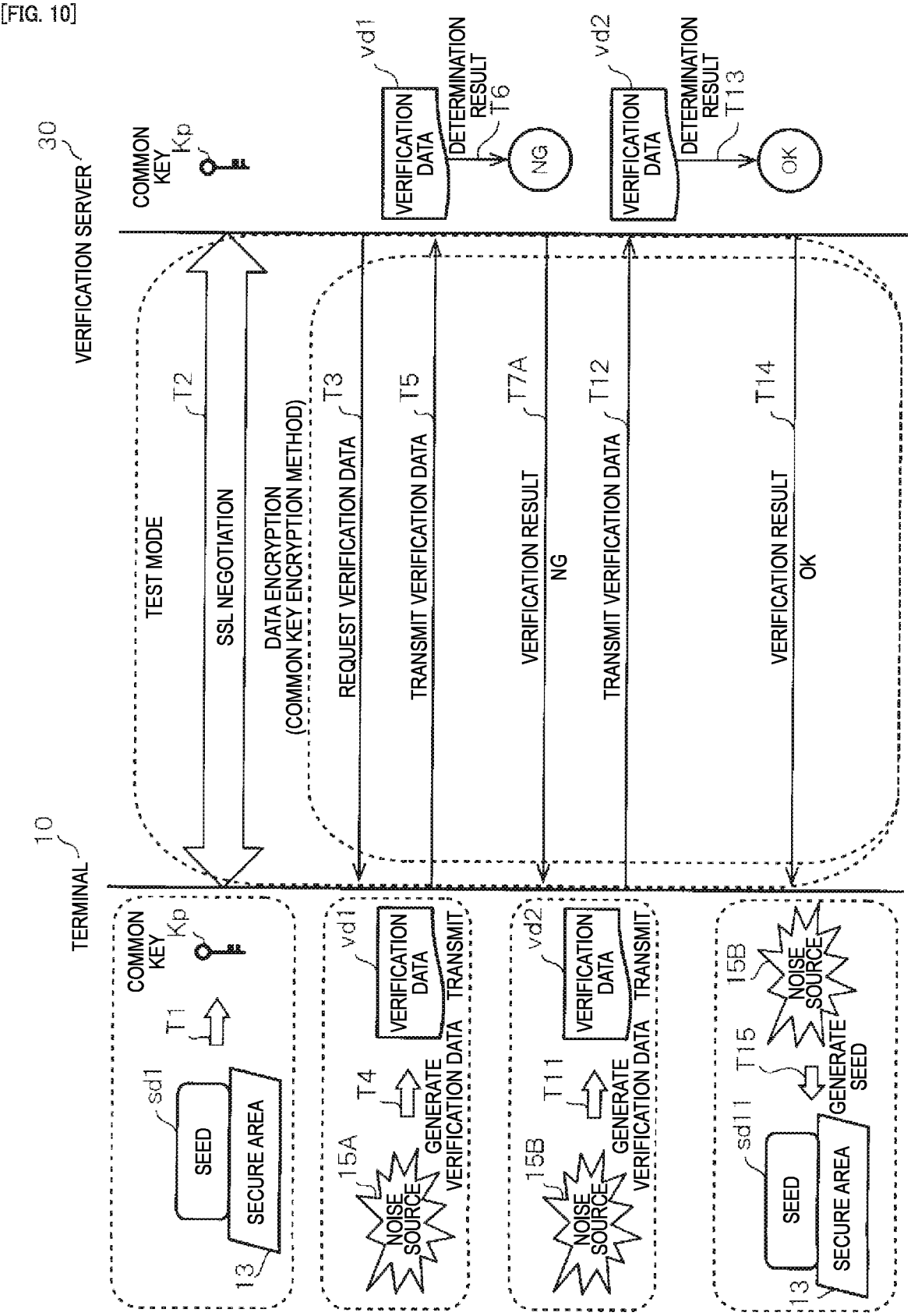
[FIG. 10]

[FIG. 11]
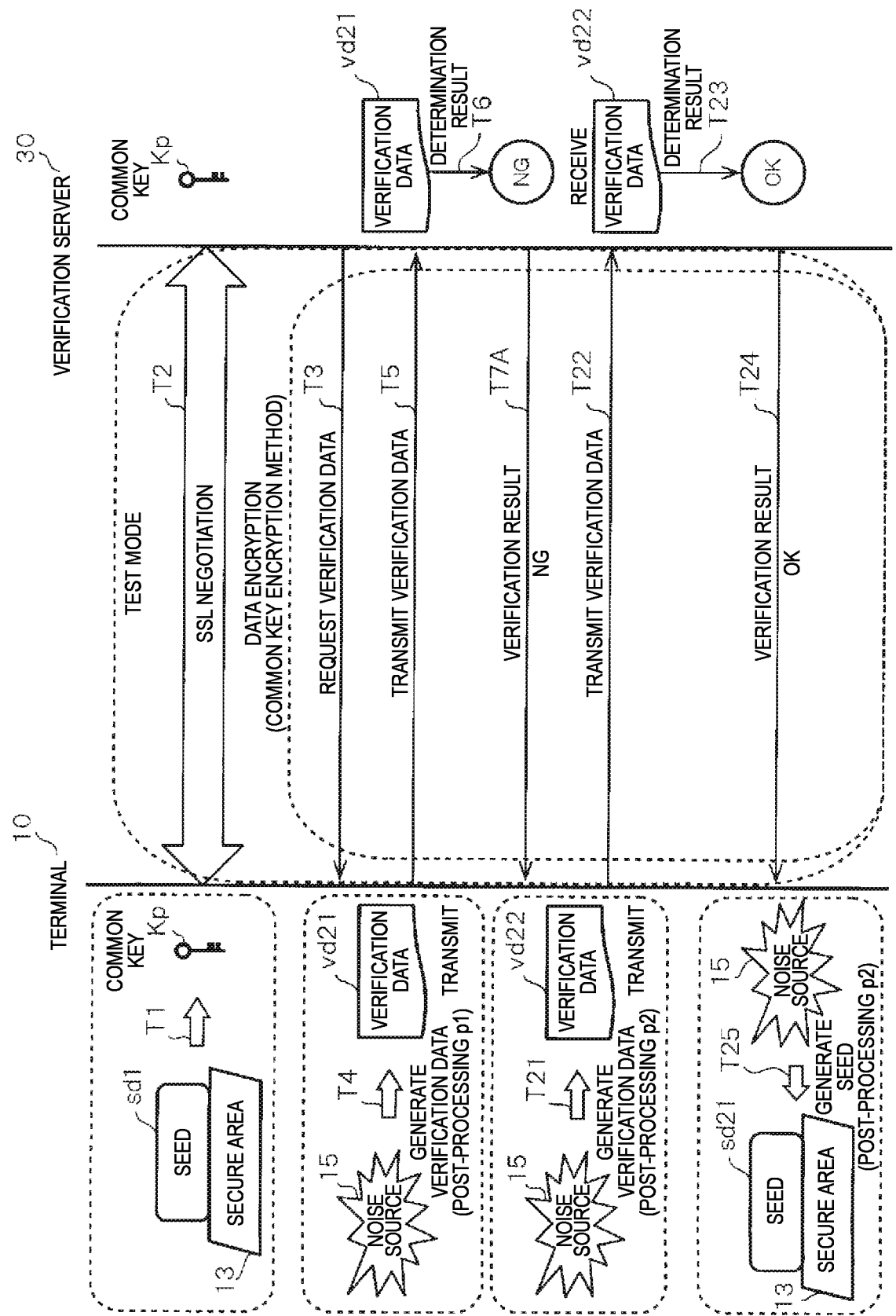

[FIG. 12]
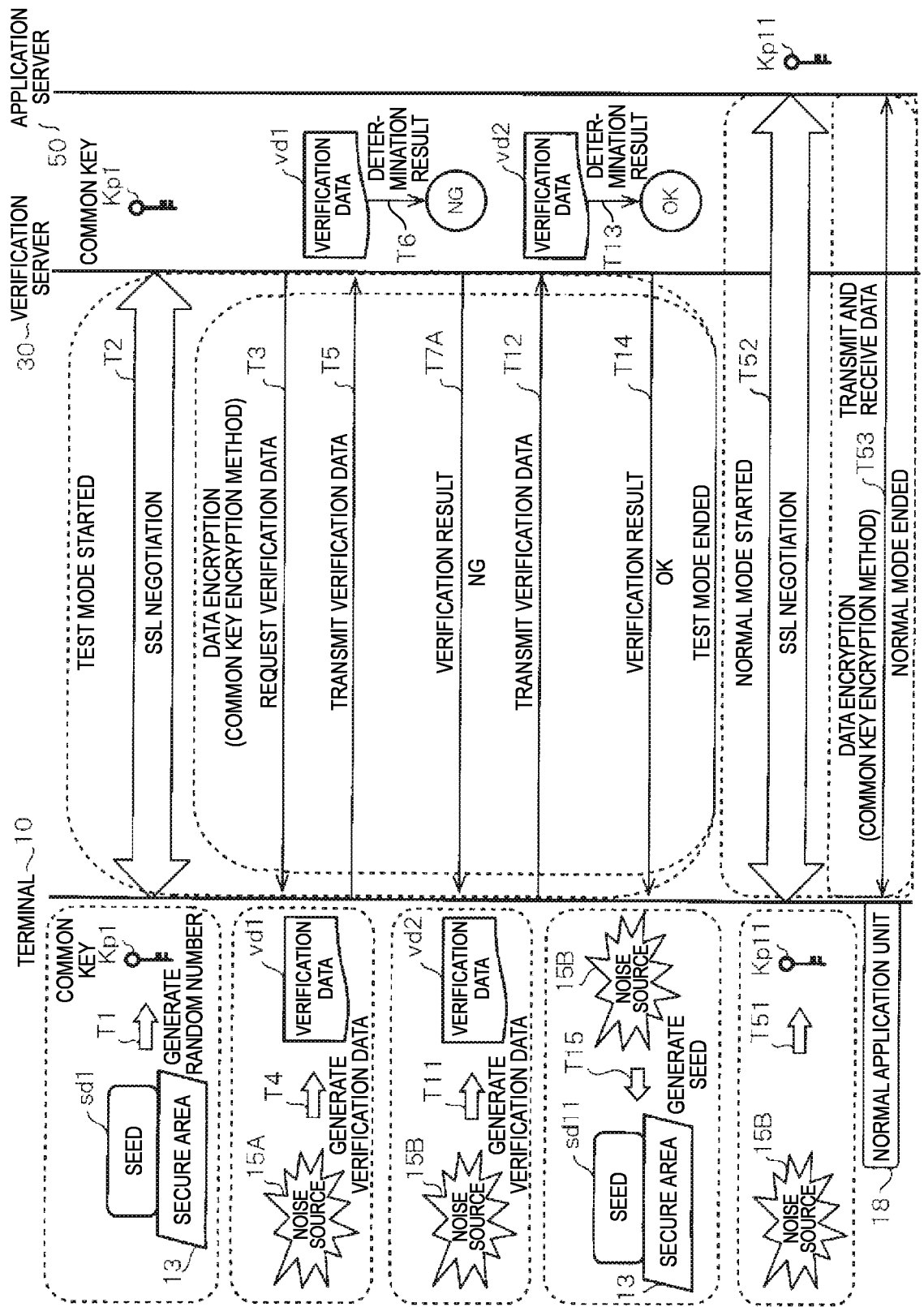

[FIG. 13]
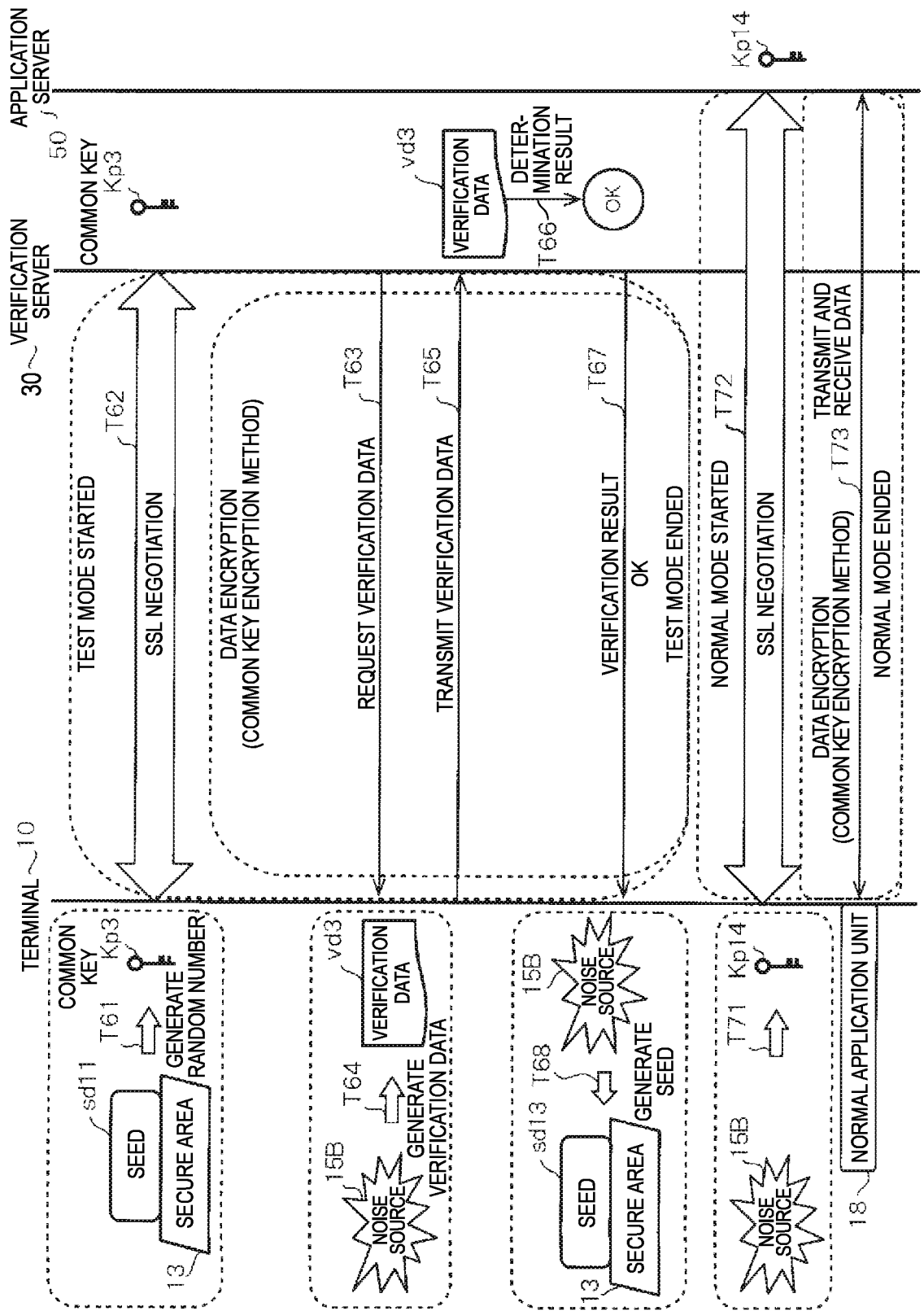

[FIG. 14]
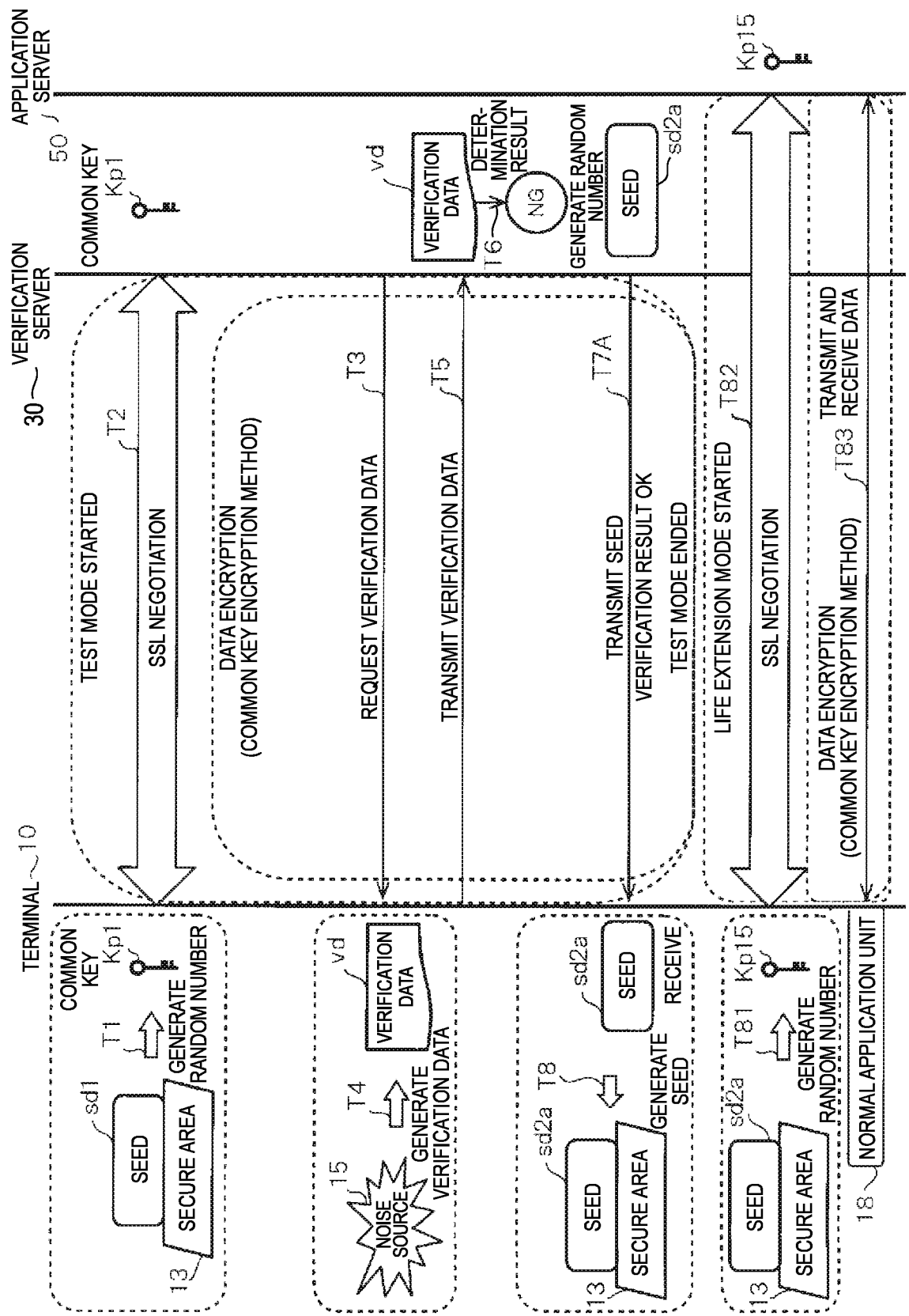

RANDOMNESS VERIFICATION SYSTEM AND METHOD OF VERIFYING RANDOMNESS

TECHNICAL FIELD

The present disclosure relates to a randomness verification system and a method of verifying randomness.

BACKGROUND ART

An IoT device is also called "Internet of things", and is a device that has a sensing device and can be connected to a communication network such as the Internet. The IoT device can communicate data on a sensing result detected by the sensing device with a cloud server on the network via the communication network.

The IoT device transmits the data on the sensing result to the cloud server, receives data on a result analyzed by the cloud server (for example, control data for controlling the IoT device), and drives an actuator included in the IoT device as necessary.

The IoT device is a device connected to the Internet, and there is a concern about security risks, and since the hardware specifications of the IoT devices are inferior to those of a personal computer (PC), it cannot be said that security measures are sufficient. When an IoT device with insufficient security measures is subjected to a cyber-attack, the cyber-attack may be spread over a wide range such as another IoT device or the entire IoT service. For example, a cyber-attack in the automobile field or the medical field may endanger the life or property of the user. Therefore, security measures with the same strength as those of the PC are required for the IoT device.

As a security measure, for example, secure Internet connection can be ensured by secure sockets layer (SSL) of an encryption communication protocol. The SSL connection requires a secure key (a random number), and the random number can be obtained by giving a seed (SEED) which is a seed of the random number to a pseudo random number generator (PRNG).

In order to obtain a secure random number, it is required that the random number or seed is generated inside the device and is secret information that cannot be known by the designer, and is regularly updated inside the device without reusing it.

However, there are a lot of IoT devices which are low in function and low in price, have no security measures, and even if security measures are taken, the security strength is low. For example, in the generation of random numbers using a pseudo random number generator, a seed incorporated to the device in advance before shipment may be reused, or a value obtained by combining time and a media access control (MAC) address may be used as a seed.

In order to increase the security strength of the IoT device, there is a method of generating a random number or a seed by incorporating a random number generation circuit configured by special hardware in the IoT device, but the method is not suitable for an IoT device manufactured in a low-end specification.

Here, as a related art having the above-described random number generation circuit, for example, a random number generation device according to Patent Literature 1 has been proposed. In the random number generation device according to the Patent Literature 1, oscillation frequency of an oscillation circuit is set by inputting a selection signal from an external device to a selector, output values from the oscillation circuit is stored, and the output values output from a sampling circuit are arranged according to a sampling clock. Accordingly, the random number generation device can generate a random number with high authenticity.

CITATION LIST

Patent Literature

Patent Literature 1: JP-A-2016-126518

SUMMARY OF INVENTION

Technical Problem

Patent Literature 1 discloses that the authenticity (irreproducibility and unpredictability) of a random number generated by a random number generation device is evaluated by an external device different from the random number generation device. However, in Patent Literature 1, there is no specific description on how the external device and the random number generation device are connected.

Here, it is assumed that the random number generation device disclosed in Patent Literature 1 is applied to an IoT device in which security vulnerability is specified during communication via a network. If the random number generation device and the external device are communicatively connected via the network, it is presumed that the random number generation device needs to securely transmit data on the random number so that the external device can evaluate the authenticity of the random number. However, since Patent Literature 1 does not consider security measures when the data on the random number is transmitted from the random number generation device to the external device, the data on the random number may be leaked when being sent to the external device. In actual operation, the IoT device generates a key for encryption (encryption key) using the random number (seed) generated by itself, and then encrypts data for communication using the encryption key. Thus, during actual operation, there is a problem that it is difficult to perform secure data communication between the IoT device and the communication partner device.

The present disclosure is proposed in view of the above situation in the related art, and an object thereof is to provide a randomness verification system and a method of verifying randomness with which data on a random number is securely sent to and received from a verification server configured to verify randomness of the random number generated by a terminal, and secure data communication is ensured between the terminal and a communication partner device during actual operation by using a random number the randomness of which is recognized by the verification server.

Solution to Problem

The present disclosure provides a randomness verification system, the randomness verification system including: a terminal; and a first server communicably connected to the terminal, in which the terminal includes a secure memory unit storing a first seed with randomness recognized in advance, and is configured to exchange a common key generated using the first seed with the first server, acquire a plurality of measured values, generate a random number as verification data using the plurality of measured values at a predetermined timing, encrypt the generated verification data with the common key, and transmit the verification data to the first server; the first server is configured to verify randomness of the verification data obtained decrypting the verification data encrypted by the terminal with the common key, and when it is determined that the verification data has randomness, transmit a verification result indicating that the randomness of the verification data is recognized to the terminal; and the terminal is configured to, in response to the reception of the verification result, acquire a plurality of measured values, update the first seed using the plurality of measured values, and store an updated seed in the secure memory unit.

The present disclosure provides a method of verifying randomness used in a randomness verification system in which a terminal and a first server are communicably connected, and the terminal including a secure memory unit storing a first seed with randomness recognized in advance, the method of verifying randomness including: exchanging a common key generated using the first seed between the terminal and the first server, by the terminal, acquiring a plurality of measured values, generating a random number as verification data using the plurality of measured values at a predetermined timing, encrypting the generated verification data with the common key, and transmitting the verification data to the first server; by the first server, verifying randomness of the verification data obtained decrypting the verification data encrypted by the terminal with the common key, and when it is determined that the verification data has randomness, transmitting a verification result indicating that the randomness of the verification data is recognized to the terminal; and by the terminal, in response to the reception of the verification result, acquiring a plurality of measured values, updating the first seed using the plurality of measured values, and storing an updated seed in the secure memory unit.

Advantageous Effects of Invention

According to the present disclosure, data on a random number can be securely sent to and received from a verification server configured to verify randomness of the random number generated by a terminal, and secure data communication can be ensured between the terminal and a communication partner device during actual operation by using a random number the randomness of which is recognized by the verification server.

BRIEF DESCRIPTION OF DRAWINGS

FIG. 1A is a block diagram showing a configuration example of a randomness verification system before shipment of a terminal.

FIG. 1B is a block diagram showing a configuration example of a randomness verification system during operation of the terminal.

FIG. 2 is a block diagram showing a configuration example of a verification server and the terminal in a test mode before shipment.

FIG. 3 is a block diagram showing a configuration example of the verification server and the terminal in the test mode in operation.

FIG. 4 is an illustrative diagram showing an example of an outline of an SSL negotiation sequence and a verification sequence in the test mode.

FIG. 5 is a block diagram showing a configuration example of the terminal in a normal mode.

FIG. 6 is a block diagram showing a configuration example of the terminal in a life extension mode.

FIG. 7 is a sequence diagram showing an example of an operation procedure when a verification result is OK in the test mode.

FIG. 8 is a sequence diagram showing an example of a first operation procedure when a verification result is NG in the test mode.

FIG. 9 is a sequence diagram showing an example of a second operation procedure when the verification result is NG in the test mode.

FIG. 10 is a sequence diagram showing an example of a third operation procedure when the verification result is NG in the test mode.

FIG. 11 is a sequence diagram showing an example of a fourth operation procedure when the verification result is NG in the test mode.

FIG. 12 is a sequence diagram showing an example of an operation procedure of shifting from the test mode to the normal mode.

FIG. 13 is a sequence diagram following FIG. 12.

FIG. 14 is a sequence diagram showing an example of an operation procedure of shifting from the test mode to the life extension mode.

DESCRIPTION OF EMBODIMENTS

Hereinafter, an embodiment (hereinafter, referred to as "the present embodiment") specifically disclosing a randomness verification system and a method of verifying randomness according to the present disclosure will be described in detail with reference to the drawings as needed. However, detailed descriptions more than necessary may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

FIG. 1A is a block diagram showing a configuration example of a randomness verification system 5A before shipment of a terminal 10.

The randomness verification system 5A shown in FIG. 1A includes a terminal 10, and a verification server 30 as an example of a first server. The terminal 10 as a shipping object and the verification server 30 are connected by a wired line L1, for example.

The terminal 10 is a communication terminal such as an Internet of things (IoT) device. As described above, the IoT device is, for example, an electronic device with a low-end specification that includes a sensing device and can be connected to a communication network such as the Internet. The IoT device can communicate data on a sensing result detected by the sensing device with a cloud server via the communication network, and drive an actuator built therein according to control data transmitted from the cloud server. Examples of the IoT device include a monitoring camera, a payment terminal, a body camera, a door phone, a multifunction device, a smart meter, a programmable logic controller (PLC), and a gateway box. In other words, the terminal 10 may be, for example, any one of the monitoring camera, the payment terminal, the body camera, the door phone, the multifunction device, the smart meter, the programmable logic controller (PLC), and the gateway box described above. Here, the terminal 10 is an electronic device with a low-end specification that does not have an advanced information processing function, but it may also be an electronic device with a high-end specification such as a personal computer (PC), a mobile phone, or a smartphone having an advanced information processing function.

Further, since IoT devices are generally low-cost devices, security thereof is vulnerable.

A local area network (LAN), universal serial bus (USB), a serial communication line or the like are used for the wired line L1 which connects the terminal 10 and the verification server 30. The wired line L1 is a secure communication path with which communication is performed between the terminal 10 and the verification server 30. The terminal 10 is not necessarily wired connected to the verification server 30 as long as communication can be performed therebetween via a secure communication path. For example, the terminal 10 and the verification server 30 may be wirelessly connected by near field communication (NFC) or wireless LAN.

FIG. 1B is a block diagram showing a configuration example of a randomness verification system 5B during operation of the terminal 10.

The randomness verification system 5B shown in FIG. 1B includes a terminal 10A, a terminal 10B, a verification server 30 as an example of a first server, and an application server 50. The terminal 10A, the terminal 10B, the verification server 30, and the application server 50 are connected via a network NW, for example. The form of the network NW may be appropriately set according to the purpose of use. That is, the network NW may be a wired network or a wireless network. Hereinafter, the application server is referred to as an application server.

A terminal 10 that is wired connected to the network NW is referred to as terminal 10A. A terminal 10 that is wirelessly connected to the network NW is referred to as terminal 10B. In particular, when there is no need to distinguish the terminal 10A and the terminal 10B, the terminal 10A and the terminal 10B are collectively referred to as the terminal 10. In the following description, the randomness verification system 5A (see FIG. 1A) before shipment of the terminal 10 and the randomness verification system 5B during operation of the terminal 10 are collectively referred to as randomness verification system 5.

The verification server 30 verifies whether the randomness is recognized or not for verification data generated by the terminal 10 and transmitted from the terminal 10 by a secure method. The randomness indicates that the verification data has suitability as a random number, for example. The suitability as a random number indicates that, for example, the appearance frequency distribution of data of a part of a bit string in each of a plurality of measured values (described below) configuring the random number is uniform. Therefore, when the data of a part of the bit string in the measured value described above appears to be biased toward a specific value, it is determined that the data lacks suitability as a random number and has no randomness. On the other hand, when the appearance frequency distribution of the data of a part of the bit string in the measured value described above is uniform, it is determined that the data has suitability as a random number and has randomness. Details of the configuration of the verification server 30 will be described later.

In a normal mode (That is, when the terminal 10 is normally operated. The same applies hereinafter.), the application server 50 performs a secure socket layer (SSL) negotiation processing with the terminal 10 to acquire and store a common key generated by the terminal 10 and transmitted from the terminal 10 during the SSL negotiation processing. Further, the application server 50 performs encryption and decryption processing on data transmitted to and received from the terminal 10 using the common key in the normal mode described above. That is, in the normal mode, the application server 50 encrypts data to be transmitted to the terminal 10 using the common key acquired by the SSL negotiation processing, and transmits the encrypted data to the terminal 10, or decrypts data encrypted by the terminal 10.

FIG. 2 is a block diagram showing a configuration example of the verification server 30 and the terminal 10 in a test mode before shipment.

In the randomness verification system 5A before the terminal 10 is shipped from a factory, the terminal 10 and the verification server 30 are directly connected by the wired line L1. The terminal 10 includes a physical random number generation unit 11, a secure area 13, a test client unit 12, a communication I/F (interface) 14, and a noise source 15. Here, the physical random number generation unit 11 and the test client unit 12 are, for example, applications executed by a processor such as a central processing unit (CPU) 20, and are configured as functional processing units of the CPU 20.

The verification server 30 includes a verification unit 31, a test server unit 32, and a communication I/F 36. Here, the verification unit 31 and the test server unit 32 are, for example, applications executed by a processor such as a CPU 40, and are configured as functional processing units of the CPU 40.

The communication I/F 14 and the communication I/F 36 are directly connected via the wired line L1 such as a wired LAN, a USB cable, and a serial communication line, and transmit and receive data with each other according to respective communication protocols.

In the verification server 30, the verification unit 31 verifies the randomness of the verification data generated by the terminal 10 and transmitted from the terminal 10 (that is, determines whether the randomness of the verification data is recognized). The verification unit 31 receives the verification data from the test server unit 32, executes the verification, and notifies the test server unit 32 of a verification result.

A method for verifying randomness by the verification unit 31 is known as a known technique. For example, techniques (for example, the repetition count test or the adaptive proportion test) described in JP-A-2016-81247 (see particularly paragraph 0008), or JP-A-2015-102981 (see particularly paragraph 0019), and non-patent literature NIST Special Publication 800-90B, "Recommendation for the Entropy Sources Used for Random Bit Generation", Elaine Barker John Kelsey, January 2016 can be given.

The test server unit 32 requests the verification data from the test client unit 12 of the terminal 10 via the communication I/F 36. The test server unit 32 receives the verification data generated by the terminal 10 and transmitted from the terminal 10 via the communication I/F 36. The test server unit 32 transmits the received verification data to the verification unit 31, and receives a verification result thereof. The test server unit 32 notifies the test client unit 12 of the verification result via the communication I/F 36.

In the terminal 10, the physical random number generation unit 11 generates a seed or verification data to be given as an initial value of a pseudo random number. The function of the seed and the verification data in the present embodiment will be described later. Specifically, when the test client unit 12 requests generation of the seed or the verification data, the physical random number generation unit 11 extracts a value that is the origin of a random number from the noise source 15 (in other words, measured value). The physical random number generation unit 11 samples (collects) a plurality of measured values until bit strings of certain digits in the extracted measured values reach a certain amount, and stores data on the bit strings corresponding to a certain number of digits obtained by the sampling (that is, a random number to be verified by the verification server 30) in a memory (not shown) as sampling data. The memory (not shown in FIG. 2) may be the secure area 13 to be described later or a memory provided in the terminal 10.

The physical random number generation unit 11 may store the sampling data as a seed in the secure area 13 when a seed is requested from the test client unit 12. Further, the physical random number generation unit 11 may store the sampling data obtained by performing predetermined post-processing (for example, a processing for increasing the entropy of a value obtained from the noise source 15 by reducing the statistical bias of the value) on the value received from the noise source 15 in the secure area 13 as a seed.

The physical random number generation unit 11 may also transmit the sampling data as the verification data to the test client unit 12 when the verification data is requested from the test client unit 12. Further, the physical random number generation unit 11 may transmit the sampling data obtained by performing predetermined post-processing (for example, a processing for increasing the entropy of a value obtained from the noise source 15 by reducing the statistical bias of the value) on the value received from the noise source 15 to the test client unit 12 as the verification data. That is, the physical random number generation unit 11 may generate the seed or the verification data after performing post-processing for improving the randomness of the sampling data (that is, increase the entropy of the seed or the validation data).

Further, the physical random number generation unit 11 can execute a plurality of types of post-processing regarding the post-processing described above, and can change and execute the post-processing pattern (that is, method) in accordance with an instruction from the test client unit 12. Examples of the plurality of post-processing include the technique described in the non-patent literature NIST Special Publication 800-90B, "Recommendation for the Entropy Sources Used for Random Bit Generation", Elaine Barker John Kelsey, January 2016. The non-patent literature disclosed that, for example, as post-processing, a plurality of simple post-processing is performed to increase an entropy rate of the output by reducing the statistical bias of sampling data obtained from the noise source of the entropy source model.

Further, the non-patent literature disclosed that, as another example of the post-processing method, the noise source itself includes a simple post-processing function for improving the quality of the output (that is, the sampling data). That is, the noise source itself uses, for example, any one of the Von Neumann method, the linear filtering method, and the run length method as the post-processing. Therefore, the physical random number generation unit 11 can be executed using any one of the plurality of types of post-processing patterns (method) disclosed in the non-patent literature described above by the physical random number generation unit 11 itself, or by the cooperation of the physical random number generation unit 11 and the noise source 15.

The physical random number generation unit 11 transmits, to the test client unit 12, the seed or the sampling data (that is, a random number to be verified by the verification server 30) as verification data in accordance with an instruction from the test client unit 12. The physical random number generation unit 11 accesses the secure area 13 in accordance with an instruction from the test client unit 12 and stores the seed or the sampling data in the secure area 13.

The test client unit 12 receives a request for verification data transmitted from the test server unit 32 via the communication I/F 14. When the verification data is requested by the test server unit 32 of the verification server 30, the test client unit 12 requests the verification data from the physical random number generation unit 11, receives the verification data from the physical random number generation unit 11, and transmits the verification data to the test server unit 32 via the communication I/F 14. The test client unit 12 receives the verification result transmitted from the verification server 30 via the communication I/F 14. The test client unit 12 requests the physical random number generation unit 11 to generate a seed when the test client unit indicates that randomness of the verification data (for example, a random number generated based on the measured values acquired from the noise source 15) is recognized, and instructs the secure area 13 to store the generated seed.

The secure area 13 as an example of a secure memory unit is a memory area that stores (holds) the seed, for example, and is an area that allows access from the physical random number generation unit 11 and prohibits access from other units. For example, a memory having tamper resistance is used as the secure area 13. By storing the seed in the secure area 13, data access to the secure area 13 from an application infected with a virus such as malware (in other words, a malicious application) can be prevented, the security of information or data stored by the terminal 10 is improved, and the security vulnerability of the terminal 10 is improved.

The noise source 15 is not limited to one in the terminal 10, but may include two or more noise sources, such as noise sources 15A and 15B described later, and each generates a random value (that is, measured value). Data on the measured values collected from the noise source (that is, a source that generates the measured values acquired by the terminal 10 (supply source)) by sampling includes a theoretical bit in an upper digit of the measured values and an effective bit in a lower digit of the measured value, and has bits of M digits, where M is an integer exponent of a power of two when expressed in binary. The theoretical bit is a value close to a theoretical value of the measured values, and is a bit string or a bit that cannot be used for generating a random number because an appearance pattern of the bit is almost constant, and lacks the suitability for generating the random number. The effective bit is a value of N (where N is an integer value less than M) digits, is a value close to an error in the measured values caused by the fluctuation in the noise source, and is a bit string or a bit that can be used for generating a random number because an appearance pattern of the bit is random, and has the suitability for generating the random number. For example, in a case where a measured value is represented by "246" in decimal notation and by a bit string of 8 digits "11110110" in binary notation, a bit string of upper 6 digits (that is, "111101") can be determined as the theoretical bit, and a bit string of lower 2 digits (that is, "10") can be determined as the effective bit. For example, the noise source 15 outputs a count value obtained by a clock counter counting a clock output from a high speed oscillator within one clock period of a low speed oscillator as a measured value.

The measured values from the noise source 15 may be generated in the terminal 10 or may be input from an external device. In addition to the count value of the clock counter described above, examples of the measured values from the noise source 15 further include an arrival time (delta time) of a packet transmitted to and received from a communication device via the network, and a delay time of a packet transmitted using a user datagram protocol (TCP) or a transmission control protocol/Internet protocol (TCP/IP). The examples of the measured values from the noise source further include a writing time and a reading time that the CPU 20 performs on a storage medium (not shown) such as a flash memory or a HDD provided in the terminal 10. Further, an error of an A/D conversion value by an AD converter (not shown) built in the CPU 20 of the terminal 10, and an error of a D/A conversion value by a DA converter (not shown) built in the CPU 20 can be exemplified.

FIG. 3 is a diagram showing a configuration example of the verification server 30 and the terminal 10 in the test mode in operation.

In the randomness verification system 5B in operation in which the terminal 10 is shipped from the factory and actually used, the terminal 10 and the verification server 30 are connected via the network NW.

In addition to the physical random number generation unit 11, the secure area 13, the test client unit 12, the communication I/F 14, and the noise source 15 (see FIG. 2), the terminal 10 further includes an encryption and decryption module unit 16 and a pseudo random number generation unit 17. Here, the encryption and decryption module unit 16, the pseudo random number generation unit 17, the physical random number generation unit 11 and the test client unit 12 are, for example, applications executed by a processor such as a central processing unit 20, and are configured as functional processing units of the CPU 20.

In addition to the verification unit 31, the test server unit 32, and the communication I/F 36 (see FIG. 2), the verification server 30 further includes a physical random number generation unit 33, an encryption and decryption module unit 34 and a noise source 35. Here, the physical random number generation unit 33, the encryption and decryption module unit 34, the verification unit 31 and the test server unit 32 are, for example, applications executed by a processor such as a central processing unit 40, and are configured as functional processing units of the CPU 40.

Since the operation of the physical random number generation unit 11, the secure area 13, the test client unit 12, the communication I/F 14 and the noise source 15 in the terminal 10 is the same as the operation of the physical random number generation unit 11, the secure area 13, the test client unit 12, the communication I/F 14 and the noise source 15 in the terminal 10 shown in FIG. 2 except that a connection form between the terminal 10 and the verification server 30 is different, the description thereof is omitted here.

The encryption and decryption module units 16 and 34 are configured to perform, by using a public key encryption method, encryption or decryption processing necessary for processing of exchanging a common key (SSL negotiation) which is used during actual secure sockets layer (SSL) communication. This SSL negotiation will be described later with reference to FIG. 4. The encryption and decryption module units 16 and 34 use the common key shared between the terminal 10 and the verification server 30 by SSL negotiation to perform the processing of encrypting or decrypting information or data using a common key encryption method on data to be transmitted or received during SSL communication.

The test server unit 32 is an application that uses SSL. When the test mode is started, the test server unit 32 starts the SSL negotiation with the terminal 10. After the SSL negotiation, the test server unit 32 performs the same procedure as in the test mode before shipping the terminal 10 (see FIG. 2). When it is determined that the verification data generated using the noise source 15 in the terminal 10 has no randomness as the verification result of the randomness for the verification data generated by the terminal 10 and transmitted from the terminal 10 by a secure method, the test server unit 32 receives a seed from the physical random number generation unit 33 in the verification server 30. Further, the test server unit 32 transmits the received seed to the test client unit 12 in the terminal 10 together with the verification result of the randomness via the communication I/F 36. When transmitting the data (for example, the seed transmitted together with the verification result of the randomness) to the terminal 10 via the communication I/F 36, the test server unit 32 acquires the data after the data is encrypted by the encryption and decryption module unit 34. When receiving encrypted data from the terminal 10 via the communication I/F 36, the test server unit 32 acquires the data after the data is decrypted by the encryption and decryption module unit 34.

The test client unit 12 is an application that uses SSL. When the test mode is started, the test client unit 12 starts SSL negotiation with the verification server 30. After the SSL negotiation, the test client unit 12 performs the same procedure as in the test mode before shipping the terminal 10 (see FIG. 2). When it is determined that the verification data generated using the noise source 15 has no randomness as the verification result of the randomness for the verification data generated by the terminal 10 and transmitted from the terminal 10 by a secure method, the test client unit 12 stops the connection with various servers by the normal application unit 18 (see FIGS. 5 and 6) or shifts the terminal 10 to the life extension mode. When transmitting the data (for example, the verification data or the common key) to the verification server 30 via the communication I/F 14, the test client unit 12 acquires the data after the data is encrypted by the encryption and decryption module unit 16. When receiving encrypted data (for example, the seed transmitted together with the verification result of the randomness) from the verification server 30 via the communication I/F 14, the test client unit 12 acquires the data after the data is decrypted by the encryption and decryption module unit 16.

Similar to the physical random number generation unit 11, the pseudo random number generation unit 17 is allowed to access the secure area 13. The pseudo random number generation unit 17 generates a random number that is a common key used when the terminal 10 performs SSL communication, using a seed (that is, the seed recognized as having randomness by the verification server 30) stored in the secure area 13, for example, during the SSL negotiation.

In the present embodiment, when the SSL communication is actually started, the terminal 10 and the verification server 30 first perform SSL negotiation, and then share the common key generated by the terminal 10 by the SSL negotiation processing.

FIG. 4 is an illustrative diagram showing an example of an outline of an SSL negotiation sequence and a verification sequence in the test mode.

First, as preparation before shipment, the seed sd generated by the physical random number generation unit 11 using the measured value obtained from the noise source 15 of the terminal 10 is sent to the verification server 30. The seed sd recognized as having randomness by the verification server 30 is stored in the secure area 13 of the terminal 10. Based on these processing, the SSL negotiation is performed between the terminal 10 and the verification server 30 in order to share a common key used for data encryption and decryption in a verification sequence performed in the test mode.

In FIG. 4, in the SSL negotiation sequence using the public key encryption method, first, the verification server 30 transmits to the terminal 10 a message including an executing request for processing of Client Hello on the terminal 10 as Hello Request processing. In response to the message from the verification server 30, the terminal 10 notifies the verification server 30 of the start of communication as processing of Client Hello. When receiving the start of communication from the terminal 10, the verification server 30 determines the encryption and hash function algorithm to be used therefrom and notifies the terminal 10 of the encryption and hash function algorithm as processing of Server Hello.

The terminal 10 transmits, to the verification server 30, common key generation information PI encrypted with a public key of the verification server 30 using the public key encryption method as processing of Client Key Exchange.

Specifically, in the processing of Client Key Exchange, when the generation of the common key is requested from the test client unit 12, the encryption and decryption module unit 16 receives the seed sd read from the secure area 13 by the pseudo random number generation unit 17 as the common key generation information PI. The common key generation information PI is information necessary for generating a random number (that is, the common key) which is a so-called premaster secret, and the same applies to the following description. The encryption and decryption module unit 16 generates and stores a common key Kp using the common key generation information PI. The encryption and decryption module unit 16 encrypts the common key generation information PI with the public key Ko of the verification server 30 to generate public key common key generation information, and passes the public key common key generation information to the test client unit 12. The test client unit 12 transmits the public key common key generation information to the test server unit 32 in the verification server 30 via the communication I/F 14.

When receiving the public key common key generation information, the test server unit 32 in the verification server 30 transmits the public key common key generation information to the encryption and decryption module unit 34. The encryption and decryption module unit 34 decrypts the public key common key generation information with a secret key Ks of the verification server 30 to obtain the common key generation information PI. The encryption and decryption module unit 34 generates and stores the common key Kp using the decrypted common key generation information PI. Thereafter, the terminal 10 transmits to the verification server 30 a notification that the common key Kp has been shared, as processing of Finished. Similarly, in response to the notification from the terminal 10, the verification server 30 transmits, to the terminal 10, a notification that the common key Kp has been shared, as processing of Finished. Therefore, the SSL negotiation between the terminal 10 and the verification server 30 is completed.

In the verification sequence after the SSL negotiation, data communication is performed between the terminal 10 and the verification server 30 by the common key encryption method using the common key shared in the SSL negotiation. The terminal 10 encrypts the verification data vd that is a seed or a random number generated by the physical random number generation unit 11 with the common key Kp, and transmits the encrypted verification data vd to the verification server 30. The verification server 30 decrypts the received verification data vd with the common key Kp, and the verification unit 31 performs verification. The verification server 30 returns a verification result thereof to the terminal 10. When returning the verification result to the terminal 10, the verification server 30 may transmit the verification result after encrypting the verification result with the common key, or without encrypting the verification result with the common key.

FIG. 5 is a block diagram showing a configuration example of the terminal 10 in the normal mode.

In the normal mode, the terminal 10 further includes a normal application unit 18 in addition to the communication I/F 14, the encryption and decryption module unit 16, the pseudo random number generation unit 17, the physical random number generation unit 11, and the noise source 15 (see FIG. 3). The normal application unit 18 is, for example, an application executed by a processor such as the CPU 20, and is configured as a functional processing unit of the CPU 20. For example, when the terminal 10 is applied to a monitoring camera, the normal application unit 18 performs each processing such as imaging, image processing, image recognition processing, and recording as a camera application.

FIG. 6 is a block diagram showing a configuration example of the terminal 10 in the life extension mode.

Here, the life extension mode refers to an operation mode in which the terminal 10 is operated as an emergency measure until the terminal 10 is replaced with a new one, in a case where the verification data vd generated based on the measured value acquired from the noise source 15 of the terminal 10 is determined to has no randomness by the verification server 30 as the verification result. Originally, since data transmitted from a terminal 10 evaluated as having no randomness has security vulnerabilities, the data may be leaked or wiretapped on the network NW by an attack by a malicious third party. Therefore, it is desirable to immediately stop the operation of the terminal 10 and replace it. However, for example, if the installation location of the terminal 10 is far away and it takes a long time and a long distance to go to the site, or if it is a monitoring camera in which the operation of the terminal 10 cannot be stopped immediately, the replacement cannot be performed immediately. Therefore, in the present embodiment, the terminal 10 is operated for an extended time until the preparation for replacement is ready.

In the life extension mode, the terminal 10 further includes the secure area 13 in addition to the communication I/F 14, the normal application unit 18, the encryption and decryption module unit 16, and the pseudo random number generation unit 17. Since the random number generated by the physical random number generation unit 11 has already been evaluated as having no randomness, the physical random number generation unit 11 and the noise source 15 are not used in the life extension mode. Instead, the terminal 10 receives the seed generated by the verification server 30, stores the seed in the secure area 13, and generates a common key using the seed, so as to ensure the security during data communication between the terminal 10 and the verification server 30 in the life extension mode.

Next, the operation of the randomness verification system 5 according to the present embodiment will be described.

FIG. 7 is a sequence diagram showing an example of an operation procedure when a verification result is OK in the test mode.

The test mode is performed between, for example, the terminal 10 and the verification server 30. Specifically, the test mode is an operation mode in which processing (test) for verifying whether the verification data (that is, random number) generated by the terminal 10 has randomness is recognized by the verification server 30 is performed. The test mode is executed every predetermined period (for example, one day). The terminal 10 generates a common key Kp based on a seed sd1 as an example of a first seed stored in the secure area 13 (that is, randomness is recognize in advance before shipping) (T1), performs SSL negotiation (T2), and shares the common key Kp with the verification server 30 (T3).

The verification server 30 requests the verification data from the terminal 10 at a predetermined timing (for example, a periodic timing or a timing when a verification request for randomness of the verification data is received from the verification server 30) (T3). In response to the request, the terminal 10 generates verification data vd from a random measured value generated by the noise source 15 (T4). The terminal 10 encrypts the verification data vd with the common key Kp, and transmits the verification data vd to the verification server 30 (T5).

When receiving the verification data vd, the verification server 30 performs verification and obtains a verification result (determination result) (T6). The verification server 30 transmits a verification result determined to be successful (OK) to the terminal 10 (T7). Even when the verification result is determined to be failure (NG), the verification server 30 transmits the verification result to the terminal 10 similarly. If the verification result is determined to be NG before shipping, the terminal 10 is not shipped.

In response to the reception of the verification result, the terminal 10 generates a seed sd2 based on a plurality of measured values acquired from the noise source 15, updates the stored seed sd1 to the seed sd2, and stores the seed sd2 in the secure area 13, so that a common key Kp is generated in the next test mode (T8). Thereafter, the terminal 10 shifts from the test mode to the normal mode. The terminal 10 may shift from the test mode to the normal mode when the verification result transmitted from the verification server 30 is received. In the normal mode, the terminal 10 generates a seed based on a plurality of measured values acquired from the noise source 15 which is determined to have randomness in the test mode (in other words, OK in verification), and uses a common key Kp generated from the seed to encrypt data to be transmitted and decrypt received data in wireless communication with a communication partner device such as a camera (not shown) or the application server 50.

According to the sequence shown in FIG. 7, each time verification is performed in the verification server 30, if randomness is recognized for the verification data (that is, random number) generated by the terminal 10, the terminal 10 can change (that is, update) the seed stored in the secure area 13. Therefore, a secure common key Kp that is not inferred by a malicious third party is generated in the SSL negotiation, so that the terminal 10 can improve the security of verification data handled in the verification, and can safely execute the test mode every time.

FIG. 8 is a sequence diagram showing an example of a second operation procedure when a verification result is NG in the test mode.

The operations in steps T1 to T6 are the same as the operations in steps T1 to T6 in the normal mode shown in FIG. 7, and a description thereof will be omitted. In FIG. 8, when the verification result is determined to be NG, the verification server 30 generates an instruction for operating the terminal 10 in the life extension mode included in the verification result. The verification server 30 generates a seed sd2a based on a value generated by the noise source 35 in its own device (T6A). Here, the verification server 30 generates the seed sd2a when the verification result is determined to be NG, but the seed may also be generated at any timing in advance, stored into a secure memory (not shown) in the verification server 30, and read out from the same secure memory when the verification result is determined to be NG. Therefore, the verification server 30 can transmit the seed to the terminal 10 promptly. It is assumed that the seed generated by the verification server 30 has randomness. The verification server 30 encrypts the seed sd2a with the common key Kp, and transmits the seed to the terminal 10 together with the verification result (T7A).

In response to the reception of the verification result including the seed sd2a from the verification server 30, the terminal 10 updates the stored seed sd1 to the seed sd2a, and stores the seed sd2a in the secure area 13 (T8A). Thereafter, the terminal 10 shifts from the test mode to the life extension mode based on the verification result from the verification server 30. The terminal 10 may shift from the test mode to the life extension mode when the verification result including the seed sd2a transmitted from the verification server 30 is received. In the terminal 10, since the verification result is determined to be NG by the verification server 30, as an example of the life extension measure of the terminal 10, in the life extension mode for a period (for example, 2 to 3 days) until replacement, a common key Kp generated by the verification server 30 based on the seed sd2d is used to encrypt data to be transmitted and decrypt received data in wireless communication with a communication partner device such as a camera (not shown) or the application server 50 as in the normal mode.

FIG. 9 is a sequence diagram showing an example of a second operation procedure when the verification result is NG in the test mode.

The operations in steps T1A to T6 are the same as the operations in steps T1 to T6 in the normal mode shown in FIG. 7, and description of the same contents is simplified or omitted, and different contents are described. In step T1A, the terminal 10 generates a common key Kp based on the seed sd1 stored in the secure area 13. On the other hand, the physical random number generation unit 11 of the terminal 10 generates a seed based on a random measured value generated by the noise source 15 at a timing (for example, in test mode before shipment, or in previous test mode during actual operation) different from the generation timing of the common key Kp, and stores the seed in the secure area 13. In FIG. 9, for example, three seeds sd1, sd2, and sd3 are stored in the secure area 13, and these seeds sd1, sd2, and sd3 are all recognized to have randomness in the test mode. Here, the seeds sd1, sd2, and sd3 may be stored in the secure area 13 as separate files, or may be stored in the secure area 13 as one file including a data string in which the seeds sd1, sd2, and sd3 are connected. In the latter case, it is preferable that management information indicating respective starts and ends of the seeds sd1, sd2, and sd3 in one file is also stored in the secure area 13.

Further, the number of seeds sd1, sd2, sd3 stored in the secure area 13 by the terminal 10 is not limited to three, but is merely an example. The number of seeds stored in the secure area 13 is appropriately determined depending on, for example, a period in which the terminal 10 is to be extended in the life extension mode, or the frequency at which the terminal 10 accesses the communication partner device such as a camera (not shown) or the application server 50.

If the verification result is NG in step T6, the verification server 30 transmits, to the terminal 10, the verification result determined to be NG including an instruction for operating the terminal 10 in the life extension mode (T7A). In response to the reception of the verification result from the verification server 30, the terminal 10 deletes the seed sd1 used for the current verification from the secure area 13 (T8B). In the secure area 13, the seed sd2 and the seed sd3 remain stored. Here, when the seeds sd1, sd2, and sd3 are stored in the secure area 13 as separate files, only a seed sd1 file is deleted, and a seed sd2 file and a seed sd3 file remain. When the seeds sd1, sd2, and sd3 are stored in the secure area 13 as one file including a connected data string, a seed sd1 part is deleted and one file including the shortened data string is still stored in the secure area 13.

Further, the terminal 10 shifts from the test mode to the life extension mode based on the verification result from the verification server 30. The terminal 10 may shift from the test mode to the life extension mode when the verification result transmitted from the verification server 30 is received. In the terminal 10, since the verification result is determined to be NG by the verification server 30, as an example of the life extension measure of the terminal 10, in the life extension mode for a period (for example, 2 to 3 days) until replacement, a common key Kp generated based on a seed (for example, seed sd2d) other than the seed sd1 which is stored in the secure area 13 is used to encrypt data to be transmitted and decrypt received data in wireless communication with a communication partner device such as a camera (not shown) or the application server 50 as in the normal mode.

FIG. 10 is a sequence diagram showing an example of a third operation procedure when the verification result is NG in the test mode.

The terminal 10 includes a plurality of noise sources 15. Here, there are two noise sources 15A and 15B. In the normal mode before the test mode started from the step T1, the terminal 10 generates the seed sd1 using a plurality of measured values generated by the noise source 15A, and further generates the common key Kp using the seed sd1. Steps T1 to T7A are the same as step T1 or steps T1A to T7 or step T7A shown in FIGS. 7 and 9, and description of the same contents is simplified or omitted, and different contents are described. However, in step T4, the terminal 10 generates the verification data vd1 based on the value generated by the noise source 15A.

If the received verification result is NG in step T7A, in response to the reception of the verification result, the terminal 10 switches the noise source used for generating the seed or the verification data from the noise source 15A to the noise source 15B, and generates the verification data vd2 based on a plurality of measured values generated by the noise source 15B as in step T4 (T11). Here, the case where two noise sources 15A and 15B are switched is described, but the verification data may be generated using at least one noise source among three or more noise sources. The terminal 10 transmits the generated verification data vd2 to the verification server 30 (T12).

When receiving the verification data vd2, the verification server 30 performs verification and obtains a verification result (determination result) as in step T6 (T13). The verification server 30 transmits a verification result determined to be OK to the terminal 10 (T14). Even when the verification result is determined to be NG, the verification server 30 transmits the verification result to the terminal 10 similarly.

In response to receiving the verification result determined to be OK, the terminal 10 generates a seed sd11 based on a plurality of measured values generated by the noise source 15B, updates the stored seed sd1 to the seed sd11, and stores the seed sd11 in the secure area 13, so that a common key Kp is generated in the normal mode or in the next test mode, for example (T15). Thereafter, the terminal 10 shifts from the test mode to the normal mode. The terminal 10 may shift from the test mode to the normal mode when the verification result transmitted from the verification server 30 is received in step T14. In the normal mode, the terminal 10 generates a seed based on a plurality of measured values acquired from the noise source 15B which is determined to have randomness in the test mode (in other words, OK in verification), and uses a common key Kp generated from the seed to encrypt data to be transmitted and decrypt received data in wireless communication with a communication partner device such as a camera (not shown) or the application server 50.

When receiving the verification result determined as NG in step T13 in the test mode, the terminal 10 can switch the noise source if there is a third noise source, and repeat the same operation. If there is no third noise source, the terminal 10 receives the seed sd2a generated by the verification server 30 and stores the seed sd2a in the secure area 13, so as to operate in the life extension mode as described above with reference to FIG. 8.

FIG. 11 is a sequence diagram showing an example of a fourth operation procedure when the verification result is NG in the test mode.

The physical random number generation unit 11 of the terminal 10 can execute a plurality of types of post-processing. In the normal mode before the test mode started from the step T1, the terminal 10 generates the seed sd1 by performing post-processing p1 on the plurality of measured values generated by the noise source 15, and further generates the common key Kp using the seed sd1. Steps T1 to T7A are the same as step T1 or steps T1A to T7 or step T7A shown in FIGS. 7 and 9, and description of the same contents is simplified or omitted, and different contents are described. However, in step T4, the terminal 10 performs the first post-processing p1 for improving the randomness on each of the plurality of measured values obtained from the noise source 15, and generates the verification data vd21.

When receiving the verification result determined as NG in step T7A, the terminal 10 performs second post-processing p2 for improving the randomness on each of the plurality of measured values obtained from the noise source 15, and generates the verification data vd22 (T21). The terminal 10 transmits the generated verification data vd22 to the verification server 30 (T22).

The verification server 30 performs verification on the verification data vd22 and obtains a verification result (T23). The verification server 30 transmits a verification result determined to be OK to the terminal 10 (T24). Even when the verification result is determined to be NG, the verification server 30 transmits the verification result to the terminal 10 similarly.

In response to receiving the verification result determined to be OK, the terminal 10 generates a seed sd21 by performing the second post-processing p2 on the plurality of measured values generated by the noise source 15, updates the stored seed sd1 to the seed sd21, and stores the seed sd21 in the secure area 13, so that a common key Kp is generated in the normal mode or in the next test mode, for example (T25). Thereafter, the terminal 10 shifts from the test mode to the normal mode. The terminal 10 may shift from the test mode to the normal mode when the verification result transmitted from the verification server 30 is received in step T24. In the normal mode, the terminal 10 uses the second post-processing p2 as a method for generating verification data determined to have randomness in the test mode (in other words, OK in verification) to generate a seed sd by performing the second post-processing p2 on the plurality of measured values generated by the noise source 15, generates a common key Kp using the generated seed sd, and uses the common key Kp to encrypt data to be transmitted and decrypt received data in wireless communication with a communication partner device such as a camera (not shown) or the application server 50.

When receiving the verification result determined as NG in step T23 in the test mode, if there is a third post-processing method, the terminal 10 can switch to the third post-processing method, and repeat the same operation. If there is no third post-processing method, the terminal 10 receives the seed sd2a generated by the verification server 30 and stores the seed sd2a in the secure area 13, so as to operate in the life extension mode as described above with reference to FIG. 8.

FIGS. 12 and 13 are sequence diagrams showing an example of an operation procedure of shifting from the test mode to the normal mode.

Steps T1 to T15 correspond to the operation when the noise source is switched in the test mode as shown in FIG. 10. The same steps as those of FIG. 10 are denoted by the same reference numerals, and the description thereof is omitted. When the test mode ends, the seed sd11 used in the next test mode is stored in the secure area 13 of the terminal 10. In addition, the noise source 15B is verified, and the test mode ends.

When the test mode ends, the terminal 10 starts the normal mode, generates and initializes a seed from the verified noise source 15B, and generates a random number as the common key generation information PI in the pseudo random number generation unit 17 (T51). The terminal 10 performs SSL negotiation with the application server 50 (T52), and shares a common key Kp11.

Thereafter, the normal application unit 18 of the terminal 10 performs data transmission and reception with the application server 50 (T53). The normal application unit 18 uses the common key Kp11 to encrypt data to be transmitted to the application server 50, and decrypts data received from the application server 50.

Thereafter, the terminal 10 starts the test mode again at a predetermined timing. Steps T61 to T68 show the operation when the verification result is OK in the test mode as shown in FIG. 7. Steps T61 to T68 in FIG. 13 are the same as steps T1 to T8 in FIG. 7, respectively. When the test mode ends, the seed sd13 generated by the verification server 30 is stored in the secure area 13 of the terminal 10 as a seed used in the next test mode.

When the normal mode is started, the terminal 10 initializes to generate a seed from the verified noise source 15B, and generates a random number as the common key generation information PI in the pseudo random number generation unit 17 (T71). The terminal 10 performs SSL negotiation with the application server 50 (T72), and shares a common key Kp14.

Thereafter, the normal application unit 18 of the terminal 10 performs data transmission and reception with the application server 50 (T73). The normal application unit 18 uses the common key Kp14 to encrypt data to be transmitted to the application server 50, and decrypts data received from the application server 50.

FIG. 14 is a sequence diagram showing an example of an operation procedure of shifting from the test mode to the life extension mode.

Steps T1 to T8 correspond to the operation when the verification server 30 generates the seed sd2a in the test mode as shown in FIG. 8. The same steps as those of FIG. 8 are denoted by the same reference numerals, and the description thereof is omitted.

When the test mode ends, the seed sd2a generated by the verification server 30 is stored in the secure area 13 of the terminal 10.

When the life extension mode is started, the pseudo random number generation unit 17 of the terminal 10 generates a random number as the common key generation information PI based on the seed sd2a stored in the secure area 13 (T81). The terminal 10 performs SSL negotiation with the application server 50 (T82), and shares a common key Kp15.

Thereafter, the normal application unit 18 of the terminal 10 performs data transmission and reception with the application server 50 (T83). The normal application unit 18 uses the common key Kp15 to encrypt data to be transmitted to the application server 50, and decrypts data received from the application server 50.

As described above, in the randomness verification system 5B of the present embodiment, the terminal 10 and the verification server 30 are communicably connected via the network NW. The terminal 10 has the secure area 13 that stores the seed sd1 (an example of the first seed) whose randomness has been recognized in advance, and exchanges the common key Kp generated using the seed sd1 with the verification server 30 (SSL negotiation). After the SSL negotiation, the terminal 10 acquires a plurality of measured values from the noise source 15, and generates a random number as the verification data vd using the plurality of measured values at a predetermined timing. The terminal 10 encrypts the generated verification data vd with the common key Kp and transmits the verification data vd to the verification server 30. The verification server 30 verifies the randomness of the verification data vd obtained by decrypting the verification data vd encrypted by the terminal 10 with the common key Kp. When determining that the verification data vd has randomness, the verification server 30 transmits, to the terminal 10, a verification result indicating that the randomness of the verification data vd is recognized. In response to the reception of the verification result, the terminal 10 acquires a plurality of measured values from the noise source 15, generates a new seed sd2 using the plurality of measured values, updates the seed sd1 stored in the secure area 13 to the seed sd2, and stores the seed sd2 in the secure area 13.

Therefore, the randomness verification system 5B can securely transmit and receive data on a random number between the terminal 10 and the verification server 30 that verifies the randomness of the verification data vd (random number) generated by the terminal 10. Further, based on the verification result indicating that the randomness is recognized by the verification server 30, the randomness verification system 5B generates and updates a secure seed from the noise source 15 in the terminal 10 at the time when the verification result is received, so that in the next test mode, a secure data communication path through which the secure seed can be transmitted and received between the terminal 10 and the verification server 30 can be ensured, and the test in the test mode can be performed safely every time. Further, in the normal mode after the test mode, the randomness verification system 5B can use the noise source 15 of the terminal 10 determined to be successfully verified in the test mode to generate a common key Kp used by the terminal 10 at the time of data communication with a communication partner device during actual operation, and can exchange the common key Kp by SSL negotiation, so that safe data communication with the communication partner device can be ensured.

When it is determined that the verification data vd has no randomness, the verification server 30 acquires a plurality of measured values from the noise source 35 of the own device, generates the seed sd2a (an example of the second seed) using the plurality of measured values, encrypts the generated seed sd2a with the common key Kp, and transmits the seed sd2a to the terminal 10 together with the verification result indicating that the randomness of the verification data is not recognized. Therefore, in the randomness verification system 5B, the verification server 30 can generate the seed sd2a having randomness as an emergency measure even if, for example, the verification data vd generated by the terminal 10 does not have randomness because the terminal 10 has an abnormality due to long-term use that does not satisfy the operation guarantee range of the terminal 10, for example. The verification server 30 can securely transmit the generated seed sd to the terminal 10. Accordingly, the terminal 10 generates the common key Kp using the seed sd2a generated by the verification server 30 without generating a seed from the noise source 15 evaluated as having no randomness, and shares the common key Kp with the verification server 30, so that the terminal 10 can be used in the life extension mode until it is replaced with a new one since the security of the information or data stored by the terminal 10 can be ensured. Accordingly, the emergency measure can be taken so that the terminal 10 does not need to be replaced immediately.

When it is determined that the verification data vd has no randomness, the verification server 30 encrypts the stored seed sd2a (an example of the second seed) with the common key Kp, and transmits the seed sd2a to the terminal 10 together with the verification result indicating that the randomness of the verification data is not recognized. The terminal 10 updates the seed sd1 (an example of the first seed) stored in the secure area 13 to the seed sd2a obtained by decrypting the seed sd2a encrypted by the verification server 30 with the common key Kp, and stores the seed sd2a in the secure area 13. Therefore, in the randomness verification system 5B, the seed sd2a generated and stored in advance by the verification server 30 can be transmitted to the terminal 10 quickly and safely even if, for example, the verification data vd generated by the terminal 10 does not have randomness because the terminal 10 has an abnormality due to long-term use that does not satisfy the operation guarantee range of the terminal 10, for example. Accordingly, the terminal 10 generates the common key Kp using the seed sd2a stored in advance by the verification server 30 without generating a seed from the noise source 15 evaluated as having no randomness, and shares the common key Kp with the verification server 30, so that the terminal 10 can be used in the life extension mode until it is replaced with a new one since the security of the information or data stored by the terminal 10 can be ensured. Accordingly, the emergency measure can be promptly taken so that the terminal 10 does not need to be replaced immediately.

The terminal 10 stores a seed group including the seed sd1 and at least one seed different from the seed sd1 (for example, seeds sd2 and sd3) in the secure area 13 in advance. The terminal 10 exchanges the common key Kp generated using any one seed (for example, the seed sd1) from the seed group with the verification server 30. When receiving from the verification server 30 a verification result indicating that the randomness of the verification data vd is not recognized, the terminal 10 deletes the seed sd1 used for generating the common key Kp from the secure area 13. The terminal 10 does not use the seed sd1 generated using the plurality of measured values from the noise source 15 which is evaluated as having no randomness, generates a new common key Kp using any seed (for example, the seed sd2) other than the seed sd1 from the seed group, and shares the common key Kp with the verification server 30. Therefore, in the randomness verification system 5B, the terminal 10 can be used in the life extension mode until it is replaced with a new one since the security of the information or data stored by the terminal 10 can be ensured. Accordingly, the emergency measure can be promptly taken so that the terminal 10 does not need to be replaced immediately.

The terminal 10 includes a plurality of noise sources 15A and 15B. The terminal 10 generates a random number as the verification data vd1 using a plurality of measured values obtained from one noise source 15A (an example of a first noise source) among the plurality of noise sources 15A and 15B, encrypts the generated verification data vd1 with the common key Kp, and transmits the verification data vd1 to the verification server 30. When receiving the verification result indicating that the randomness of the verification data vd is not recognized from the verification server 30, the terminal 10 generates a random number as the verification data vd2 using a plurality of measured values obtained from the noise source 15B (an example of a second noise source) which is different from the noise source 15A among the plurality of noise sources 15A and 15B. The terminal 10 encrypts the generated verification data vd2 with the common key Kp and transmits the verification data vd2 to the verification server 30. Therefore, in the randomness verification system 5B, when the terminal 10 includes a plurality of noise sources, and the verification data generated based on the plurality of measured values obtained from any one of the noise sources is recognized as having no randomness, the noise source of the terminal 10 can be switched to another noise source. Accordingly, the terminal 10 can generate verification data that can be recognized as having randomness, and can improve the possibility of continuously using the terminal 10.

The terminal 10 can execute a plurality of post-processing p1 and p2 for improving the randomness of the verification data vd using a plurality of measured values. When receiving the verification result indicating that the randomness of verification data vd21 is not recognized, the verification data vd21 being generated by executing post-processing p1 (an example of first post-processing) among the plurality of post-processing, the terminal 10 generates a random number as verification data vd22 by executing post-processing p2 which is different from the post-processing p1. Accordingly, in the randomness verification system 5B, when the randomness of the verification data generated by the terminal 10 is not recognized, by switching to another post-processing and executing the same, verification data that can be recognized as having randomness can be generated, and the possibility of continuously using the terminal 10 can be improved.

The timing (the predetermined timing) at which the terminal 10 generates a random number as the verification data vd using a plurality of measured values obtained from the noise source 15 is, for example, a periodic timing. Therefore, the randomness verification system 5B can verify whether the verification data periodically generated by the terminal 10 has or has no randomness in the verification server 30, and can ensure the security of the information or data stored by the terminal 10. In particular, when the terminal 10 is an IoT device, security vulnerability to the terminal 10 can be improved.

The timing (the predetermined timing) at which the terminal 10 generates a random number as the verification data vd using a plurality of measured values obtained from the noise source 15 is, for example, a timing at which a request from the verification server 30 is received. Accordingly, the randomness verification system 5B can promptly verify (test) the randomness in response to the request of the verification server 30, so that the security of the information or data stored by the terminal 10 can be secured as appropriate.

The terminal 10 exchanges the common key Kp11 (second common key) generated using the new seed sd11 (in other words, updated seed) stored in the secure area 13 with the application server 50 (an example of a second server). The terminal 10 transmits and receives data encrypted with the common key Kp11 to and from the application server 50. Therefore, security in performing data communication between the terminal 10 and the application server 50 can be improved, and secure data communication can be ensured.

When the terminal 10 and the verification server 30 are connected via a secure communication path (for example, the wired line L1 shown in FIG. 1A), the terminal 10 acquires a plurality of measured values from the noise source 15, generates a random number as the verification data vd, and transmits the generated verification data vd to the verification server 30. The verification server 30 verifies the randomness of the verification data vd generated by the terminal 10. When determining that the verification data vd has randomness, the verification server 30 transmits, to the terminal 10, a verification result indicating that the randomness of the verification data vd is recognized. In response to the reception of the verification result, the terminal 10 acquires a plurality of measured values from the noise source 15, generates a new seed sd using the plurality of measured values for update in the secure area 13, and stores the updated seed sd. Therefore, in the randomness verification system 5B, for example, before the terminal 10 is shipped from the factory, processing including encryption and decryption can be omitted at the time of data communication between the terminal 10 and the verification server 30, and the randomness of the random number which is the verification data can be easily verified. Therefore, if a terminal whose security cannot be ensured is found before actual operation, for example, before shipment from the factory, the shipment can be stopped.

Although the embodiment is described above with reference to the drawings, it is needless to say that the present disclosure is not limited to such examples. It will be apparent to those skilled in the art that various changes and modifications can be conceived within the scope of the appended claims, and it is to be understood that they also belong to the technical scope of the disclosure. Each component in the embodiment described above may be combined freely in the range without deviating from the spirit of the invention.

For example, in the embodiment described above, when the verification result of the verification data is NG, the terminal 10 switches the noise source 15 to generate the verification data vd, or switches post-processing on a random measured value generated by the noise source 15. The terminal 10 may combine these two kinds of switching. That is, the terminal 10 may generate the verification data by combining the switching of the noise source 15 and the switching of the post-processing. Accordingly, the terminal 10 can generate the verification data by various methods, and when the verification result is NG, the verification data is generated by another method, so that the case in which the terminal 10 has to be replaced can be reduced.

The present application is based on a Japanese patent application (NO. 2017-110213) filed on Jun. 2, 2017, the contents of which are incorporated by reference in this application.

INDUSTRIAL APPLICABILITY

The present disclosure is useful as a randomness verification system and a method of verifying randomness with which data on a random number is securely sent to and received from a verification server configured to verify randomness of the random number generated by a terminal, and secure data communication is ensured between the terminal and a communication partner device during actual operation by using a random number the randomness of which is recognized by the verification server.

REFERENCE SIGNS LIST 5A, 5B randomness verification system
10 terminal
11, 33 physical random number generation unit
12 test client unit
13 secure area
14, 36 communication I/F
15, 35 noise source
16, 34 encryption and decryption module unit
17 pseudo random number generation unit
18 normal application unit
20, 40 CPU
30 verification server
31 verification unit
32 test server unit
50 application server

The invention claimed is:

1. A randomness verification system comprising:
a terminal; and
a first server communicably connected to the terminal,
wherein the terminal includes a secure memory unit storing a first seed with randomness recognized in advance, and is configured to exchange a common key generated using the first seed with the first server, acquire a plurality of measured values, generate a random number as verification data using the plurality of measured values at a predetermined timing, encrypt the generated verification data with the common key, and transmit the verification data to the first server;
wherein the first server is configured to verify randomness of the verification data obtained decrypting the verification data encrypted by the terminal with the common key, and when it is determined that the verification data has randomness, transmit a verification result indicating that the randomness of the verification data is recognized to the terminal; and
wherein the terminal is configured to, in response to a reception of the verification result, acquire a plurality of measured values, update the first seed using the plurality of measured values, and store an updated seed in the secure memory unit.

2. The randomness verification system according to claim 1,
wherein the first server is configured to, when it is determined that the verification data has no randomness, acquire a plurality of measured values, generates a second seed using the plurality of measured values, encrypt the generated second seed with the common key, and transmit the encrypted second seed to the terminal; and wherein the terminal is configured to update the first seed with the second seed obtained by decrypting the second seed encrypted by the first server with the common key, and store the second seed in the secure memory unit.

3. The randomness verification system according to claim 1, wherein the first server is configured to, when it is determined that the verification data has no randomness, encrypt a second seed stored in advance with the common key and transmit the encrypted second seed to the terminal; and wherein the terminal is configured to update the first seed with the second seed obtained by decrypting the second seed encrypted by the first server with the common key, and store the second seed in the secure memory unit.

4. The randomness verification system according to claim 1, wherein the terminal is configured to store in advance in the secure memory unit a seed group including the first seed and at least one seed which is different from the first seed;

when receiving a verification result indicating that randomness of the verification data is not recognized, delete the first seed from the secure memory unit; and generate a new common key using one seed other than the first seed from the seed group and exchange the new common key with the first server.

5. The randomness verification system according to claim 1, wherein the terminal includes a plurality of noise sources, and is configured to generate the verification data using a plurality of measured values acquired from a first noise source among the plurality of noise sources, encrypt the generated verification data with the common key, and transmit the encrypted verification data to the first server; and when receiving a verification result indicating that randomness of the verification data is not recognized, generate the verification data using a plurality of measured values acquired from a second noise source which is different from the first noise source among the plurality of noise sources, encrypt the generated verification data with the common key, and transmit the encrypted verification data to the first server.

6. The randomness verification system according to claim 1, wherein the terminal is capable of executing a plurality of post-processing for improving randomness of the verification data using the plurality of measured values; and wherein when receiving a verification result indicating that randomness of the verification data is not recognized, the verification data being generated by executing a first post-processing, the terminal generates the verification data by executing a second post-processing which is different from the first post-processing.

7. The randomness verification system according to claim 1, wherein the predetermined timing is a periodic timing.

8. The randomness verification system according to claim 1, wherein the predetermined timing is a timing at which a verification request for randomness of the verification data is issued from the first server.

9. The randomness verification system according to claim 1, wherein the terminal is configured to exchange with a second server a second common key generated by using the updated first seed stored in the secure memory unit; and transmit and receive data encrypted with the second common key to and from the second server.

10. A method of verifying randomness used in a randomness verification system in which a terminal and a first server are communicably connected, and the terminal including a secure memory unit storing a first seed with randomness recognized in advance, the method of verifying randomness comprising:

exchanging a common key generated using the first seed between the terminal and the first server;

by the terminal, acquiring a plurality of measured values, generating a random number as verification data using the plurality of measured values at a predetermined timing, encrypting the generated verification data with the common key, and transmitting the verification data to the first server;

by the first server, verifying randomness of the verification data obtained decrypting the verification data encrypted by the terminal with the common key, and when it is determined that the verification data has randomness, transmitting a verification result indicating that the randomness of the verification data is recognized to the terminal; and by the terminal, in response to the reception of the verification result, acquiring a plurality of measured values, updating the first seed using the plurality of measured values, and storing an updated seed in the secure memory unit.

* * * * *